United States Patent
Del Rio et al.

(10) Patent No.: US 12,338,617 B2
(45) Date of Patent: Jun. 24, 2025

(54) RESILIENT CONNECTOR AND METHODS OF USE OF SAME

(71) Applicant: Blokable, LLC, Sacramento, CA (US)

(72) Inventors: Nelson Del Rio, Redding, CA (US); Phong Anh Le, Los Angeles, CA (US); Timothy Bryce Miller, Sacramento, CA (US); Przemyslaw Olszewski, Portland, OR (US); Roger Paul Young, Irvine, CA (US); Dayu Li, Irvine, CA (US); Faizan Sidiqui, Irvine, CA (US); Arshia Keivan, Irvine, CA (US)

(73) Assignee: Blokable, LLC, Sacramento, CA (US)

( * ) Notice: Subject to any disclaimer, the term of this patent is extended or adjusted under 35 U.S.C. 154(b) by 379 days.

(21) Appl. No.: 17/855,618

(22) Filed: Jun. 30, 2022

(65) Prior Publication Data

US 2023/0003243 A1 Jan. 5, 2023

Related U.S. Application Data

(60) Provisional application No. 63/245,061, filed on Sep. 16, 2021, provisional application No. 63/218,227, filed on Jul. 2, 2021.

(51) Int. Cl.
*F16B 9/00* (2006.01)
*E04B 1/24* (2006.01)

(52) U.S. Cl.
CPC .... *E04B 1/2403* (2013.01); *E04B 2001/2406* (2013.01); *E04B 2001/2457* (2013.01)

(58) Field of Classification Search
CPC .......... E04B 1/2403; E04B 2001/2406; E04B 2001/2457; F16B 9/00; F16B 9/05
USPC ......................................................... 52/655.1
See application file for complete search history.

(56) References Cited

U.S. PATENT DOCUMENTS

| | | | | |
|---|---|---|---|---|
| 3,429,092 A | * | 2/1969 | Hart | E04B 1/20 52/236.7 |
| 5,438,811 A | * | 8/1995 | Goya | F16B 9/058 52/704 |
| 5,660,017 A | * | 8/1997 | Houghton | E04H 9/024 52/283 |

(Continued)

FOREIGN PATENT DOCUMENTS

| | | |
|---|---|---|
| JP | H08144383 A | 6/1996 |
| JP | 2013245501 A | 12/2013 |

(Continued)

OTHER PUBLICATIONS

International Search Report and Written Opinion for PCT/US2022/035839 dated Oct. 26, 2022, 11 pages.

*Primary Examiner* — James J Buckle, Jr.
(74) *Attorney, Agent, or Firm* — Cozen O'Connor

(57) ABSTRACT

A connector includes a first joint member, a second joint member, and a fastener. The first joint member includes a first tubular outer wall at least partially enclosing a first outer cavity, and a first tubular inner wall at least partially enclosing a first inner cavity. The second joint member includes a second tubular outer wall at least partially enclosing a second outer cavity, and a second tubular inner wall at least partially enclosing a second inner cavity. The fastener extends through first and second openings of the first inner cavity, and through first and second openings of the second inner cavity to position the first joint member relative to the second joint member.

24 Claims, 18 Drawing Sheets

(56) References Cited

U.S. PATENT DOCUMENTS

| | | | | |
|---|---|---|---|---|
| 5,921,049 | A * | 7/1999 | Sugiyama | F16B 9/058 52/656.1 |
| 6,591,573 | B2 * | 7/2003 | Houghton | E04B 1/2403 52/655.1 |
| 6,974,276 | B2 * | 12/2005 | Kirchner | F16B 7/0486 248/62 |
| 10,907,342 | B1 | 2/2021 | Parkhouse et al. | |
| 11,230,838 | B1 * | 1/2022 | Mendez-Vazquez | E04B 1/388 |
| 11,732,459 | B2 * | 8/2023 | Bowron | E04B 1/5825 52/655.1 |
| 12,091,879 | B1 * | 9/2024 | Abbas | E04H 9/04 |
| 2015/0275501 | A1 * | 10/2015 | Houghton | E04H 9/024 52/854 |
| 2015/0292194 | A1 | 10/2015 | Calafatis et al. | |
| 2017/0306610 | A1 | 10/2017 | Leahy | |
| 2020/0354950 | A1 | 11/2020 | Bowron | |
| 2023/0121784 | A1 * | 4/2023 | Del Rio | E04B 1/3483 52/215 |

FOREIGN PATENT DOCUMENTS

| | | |
|---|---|---|
| KR | 101809725 B1 | 1/2018 |
| WO | 2019213439 A1 | 11/2019 |

* cited by examiner

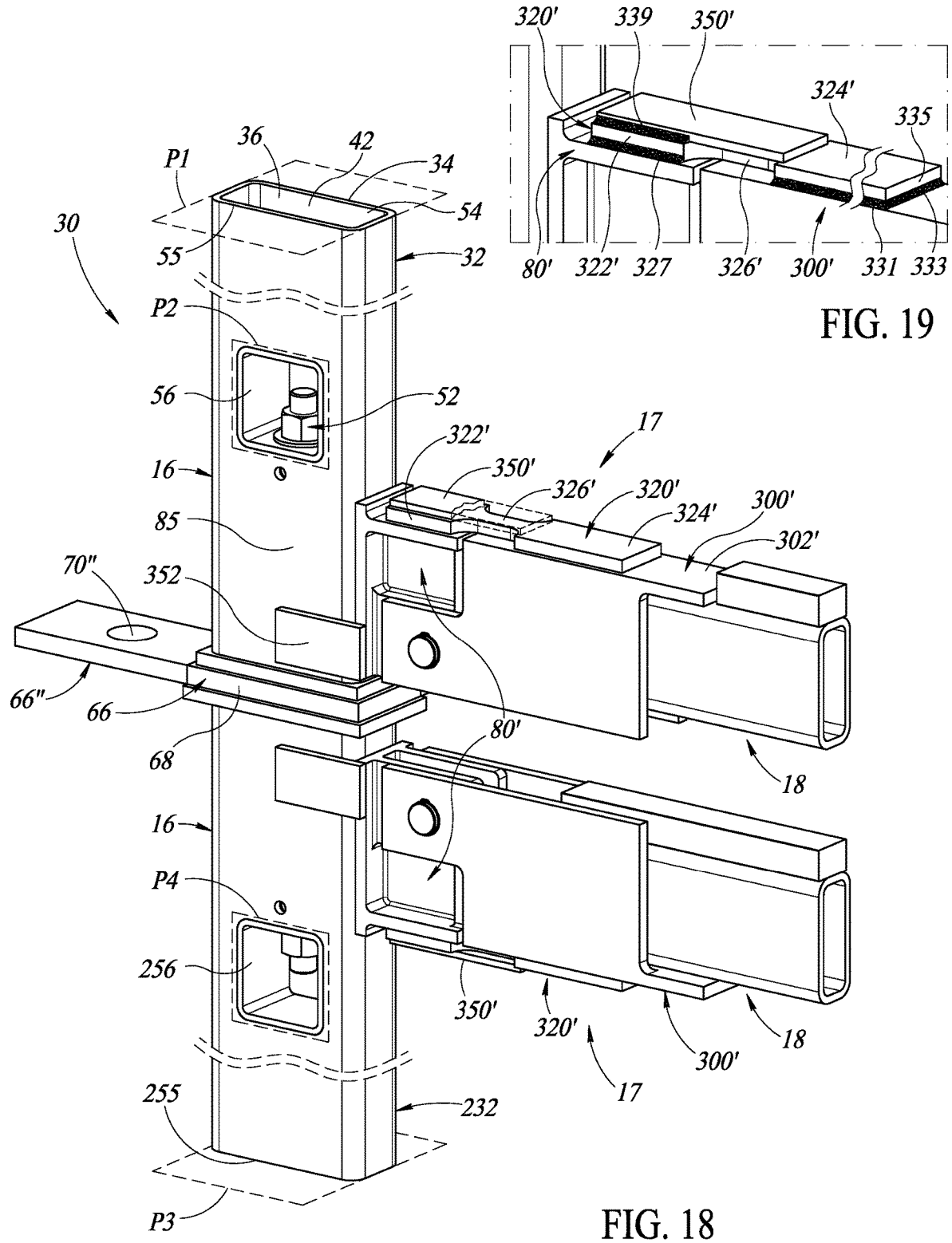

RESILIENT CONNECTOR AND METHODS OF USE OF SAME

BACKGROUND

Technical Field

The present disclosure relates generally to modular structure construction, and specifically to connectors used during the construction of said modular structures.

Description of the Related Art

In recent years, the availability of affordable housing has become an issue for many communities around the country and throughout the world. Certain segments of the population, such as the poor or elderly, may be especially susceptible to the increased cost and decreased availability of housing. As a result, many people are either living in substandard housing or are forced to commute long distances to work at their jobs.

One of the issues exacerbating this housing crisis is the amount of time and resources that are necessary to construct a single family home or a multi-unit dwelling. Such constructions times can take anywhere from several weeks to several months or more, and may require teams of workers and contractors to construct a home or dwelling at a construction site.

In addition to time constraints, current building practices rely upon a division of labor and responsibilities to incorporate technology into the home or dwelling unit. As such, a primary contractor may be responsible for erecting the structural components that are used to modify walls or other structural components to incorporate various types of technologies and capabilities, including networking, communications, and sensing capabilities, into the structure.

Modular structures may be used to decrease construction time for various types of dwelling units. At least portions of such modular units may pre-fabricated at a facility located away from the construction site, and shipped to the construction site to be quickly and efficiently incorporated into the modular structure. Because such portions may be pre-fabricated to be included within multiple types of modular structures, the cost of such fabrication may be kept relatively low. One example of a known modular structure is described in PCT Application No. PCT/US2019/030465, filed May 2, 2019, the disclosure of which is hereby incorporated in its entirety.

Referring to FIG. 1, a known modular structure 100 has a subfloor 102 that may be tilted to slope downwardly towards an interior portion 104 of the modular structure 100. The modular structure 100 may have a length 106, a width 108, and a height 110. In some implementations, the modular structure 100 may also include a frame 112 and a floor 114. The frame 112 may be comprised of metal (e.g., steel), a composite material (e.g., oriented strand board, fiber reinforced polymers), or other materials. The frame 112 may extend through one or more of the length 106, the width 108, and/or the height 110 of the modular structure 100, and may delineate an interior portion 122 of the modular structure 100 from an exterior 124 of the modular structure 100. All or substantially all of the materials employed in the modular structure 100 may be fireproof or fire resistant (e.g., glass fiber reinforced sheetrock, steel, mineral wool) and/or may have a fire retardant coating or covering thereon.

The frame 112 may include one or more structural frame members 118. Each of the structural members of the frame 112 may extend along one or more of the length 106, width 108, and/or height 110 of the modular structure 100. The structural members may be used to outline a shape for the modular structure 100. For example, the structural members may include a set of vertical structural frame members 118a, a set of lower horizontal structural frame members 118b, and a set of upper horizontal structural frame members 118c that may be used to outline a three dimensional shape, such as a cuboid. As such, the set of lower horizontal structural frame members 118b may include a first pair of opposing lower horizontal structural frame members 118b that extend along the length 106 of the modular structure 100, and a second pair of opposing lower horizontal structural frame members 118b that extend along the width 108 of the modular structure 100.

The set of upper horizontal structural frame members 118c in such an implementation may include a first pair of opposing upper horizontal structural frame members 118c that extend along the length 106 of the modular structure 100, and a second pair of opposing upper horizontal structural frame members 118c that extend along the width 108 of the modular structure 100. The vertical structural frame members 118a in such an implementation may extend between the lower horizontal structure frame members 118b and the upper horizontal structural frame members 118c. In such an implementation, the set of lower horizontal members 118b may form a perimeter 120 of the modular structure 100. In some implementations, the structural members may be used to outline other types of shapes for the modular structure 100.

The dimensions of the modular structure 100 (e.g., the length 106, the width 108, and/or the height 110) may be based upon one or more criteria. Such criteria may reflect the environment and/or usage of the modular structure 100. For example, the dimensions of the modular structure 100 may be the same or substantially similar to the dimensions of one or more types of intermodal container (e.g., 20-foot containers or 40-foot containers) to facilitate transport via various modes of transportation (e.g., ships, trains, trucks) to a location. In such an implementation, the modular structure 100 may include other features or components that reflect the environment and/or usage of the modular structure 100. For example, in implementations in which the modular structure 100 has the same or substantially similar dimensions to a type of intermodal container, the modular structure 100 may include one or more couplers (e.g., twist lock fittings) at appropriate locations such that the modular structure 100 may be selectively, releaseably, physically coupled and secured to other intermodal containers for transport.

In some implementations, the modular structure 100 may include a floor 114 that extends across some or all of the length 106 and/or the width 108 of the modular structure 100 proximate a bottom portion 128 of the modular structure 100. The floor may be physically coupled to the frame 112 using one or more physical couplers (e.g., bolts, screws, nails, staples, adhesives). The floor 114 may include an upper surface 130 that faces toward the interior portion 122 of the modular structure 100 and an opposing lower surface 132 that faces toward the exterior 124 of the modular structure. The upper surface 130 may be separated from the opposing lower surface 132 by a thickness 134 of the floor 114 in which one or both of the upper surface 130 and the lower surface 132 may be substantially parallel to a horizontal plane. As such, the upper surface 130 may be used to support items located within the interior portion 122 of the modular structure.

In some implementations, the floor 114 may be supported by one or more support members that may extend across length 106 and/or the width 108 of the modular structure. For example, in some implementations, one or more metal beams may extend across the width 108 of the modular structure 100 along the bottom portion 128 of the modular structure 100. The lower surface 132 of the floor 114 may thereby rest on top of such support members.

The modular structure 100 may include one or more sealing systems 148 that may be used to create a waterproof seal and/or an air-tight seal within the modular structure 100 or between components thereof.

A number of structural frame members 118 may be physically coupled together using a connector 150, as shown in the call out in FIG. 1. Each connector 150 may include a first leg 152 and a second leg 154 in which the first leg 152 and the second leg 154 are arranged at an angle to each other. The angle formed by the first leg 152 and the second leg 154 may be based, at least in part, on the shape of the modular structure 100. In implementations in which the modular structure 100 forms a cuboid, as shown in FIG. 1, the first leg 152 and the second leg 154 may be arranged at a ninety degree angle with respect to each other.

Each of the first leg 152 and the second leg 154 may have a respective cavity 156 (one shown) with an opening 158 that faces away from the connector 150. The opening 158 and/or the cavity 156 may be shaped and dimensioned to receive one of the structural frame members 118 in the modular structure 100. In some implementations, the opening 158 and/or cavity 156 may have dimensions that are only slightly larger than the outside dimensions of the structural frame member 118. As such the structural frame member 118 may form a close fitting or tight physical coupling with the opening 158 and/or cavity 156. In some implementations, one or more of the structural frame members 118 and the connector 150 may include a hollow cavity. In such implementations, such hollow cavities may be used to run one or more wires, cables, and/or optical fibers, as discussed below.

In some implementations, the connector 150 may have corresponding sidewall apertures 160 on opposing sidewalls of either or both of the first leg 152 and/or the second leg 154 (one shown in FIG. 1). Each pair of opposing sidewall apertures 160 may align with a corresponding frame member aperture 162 when the structural frame member 118 is inserted into the cavity 156. The frame member aperture 162 may extend through the structural frame member 118 such that the structural frame member 118 may be selectively, releaseably, physically secured to the connector 150 by, for example, inserting a pin 164 through the opposing sidewall apertures 160 and the frame member aperture 162.

The connector 150 may include a post 166 that may be oriented in a vertical direction to be physically coupled to one of the vertical structural frame members 118a. In some implementations, the post 166 may be sized to be securely inserted into an opening 168 in the vertical structural frame member 118a. In some implementations, the vertical structural frame member 118a may include opposing sidewall apertures 162, and the post 166 may include a corresponding post aperture 170 that extends through the post 166. As such, the post 166 and the vertical structure frame member 118a may be selectively, releasably physically secured to the connector 150 via the post 166.

BRIEF SUMMARY

Multiple modular structures may be coupled together (e.g., vertically, horizontally, or both) to construct a larger building (e.g., a multi-unit dwelling or a commercial building). Methods of construction employing the use of modular structures present challenges regarding access to portions of those modular structures. For example, coupling one modular structure vertically with another modular structure may result in limited access to upper surfaces of the lower modular structure and lower surfaces of the upper modular structure as the upper and lower surfaces face each other in close proximity thereby limiting space for tools to engage components on those upper and lower surfaces.

Additionally, dependent on the region in which the building is constructed, hazards (e.g., environment hazards) may result in failure of structural components of the building. It may be desirable to control one or more facets (e.g., location, specific component, etc.) of such potential failures. Such control may prevent certain failure modes (e.g., total collapse), and may further facilitate repairs conducted after a failure event occurs.

More generally, a connector that connects structural members within a structural block (e.g., hollow structural section beams and columns), and that also connects adjacent structural blocks (e.g., first and second hollow structural section columns) may result in a more stable modular structure, as well as reduced costs due to a reduction in parts and labor used in the production of such modular structures.

According to one aspect of the disclosure, a connector includes a first joint, a second joint member, and a fastener. The first joint member includes a first tubular outer wall and a first outer cavity, the first outer cavity at least partially enclosed within the first tubular outer wall. The first joint member further includes a first tubular inner wall and a first inner cavity, the first inner wall positioned within the first outer cavity, and the first inner cavity at least partially enclosed within the first tubular inner wall such that at least a portion of a first inner surface of the first tubular outer wall faces at least a portion of a first outer surface of the first tubular inner wall. The first tubular inner wall forms a first opening and a second opening of the first inner cavity, the first opening spaced from the second opening along an axis that extends in a first direction.

The second joint member includes a second tubular outer wall and a second outer cavity, the second outer cavity at least partially enclosed within the second tubular outer wall. The second joint member further includes a second tubular inner wall and a second inner cavity, the second tubular inner wall positioned within the second outer cavity, and the second inner cavity at least partially enclosed within the second tubular inner wall such that at least a portion of a second inner surface of the second tubular outer wall faces at least a portion of a second outer surface of the second tubular inner wall. The second tubular inner wall forms a first opening and a second opening of the second inner cavity, the first opening spaced from the second opening along the axis. The fastener extends through the first opening of the first inner cavity, the second opening of the first inner cavity, the first opening of the second inner cavity, and the second opening of the second inner cavity to position the first joint member relative to the second joint member.

According to another aspect of the disclosure, a connector includes a joint member having a tubular outer wall and an outer cavity, the outer cavity at least partially enclosed within the tubular outer wall. The joint member further includes a tubular inner wall and an inner cavity, the tubular inner wall positioned within the outer cavity, and the inner cavity at least partially enclosed within the tubular inner wall such that at least a portion of an inner surface of the tubular outer wall faces at least a portion of an outer surface of the tubular inner wall. The tubular inner wall forms a first opening and a second opening of the inner cavity, and the first opening is spaced from the second opening along an axis. The tubular outer wall forms a first opening and a second opening of the outer cavity. The first opening of the outer cavity is formed within a first plane that is normal to the axis, and the second opening of the outer cavity is formed within a second plane that is perpendicular to the first plane.

According to one aspect of the disclosure, a method of securing a plurality of hollow structural section members includes securing a first hollow structural section column to a tubular outer wall of a first joint member. The tubular outer wall at least partially enclosing a tubular inner wall of the first joint member, and the tubular inner wall enclosing an inner cavity of the first joint member. The method further includes securing a second hollow structural section column to a tubular outer wall of a second joint member. The tubular outer wall of the second joint member at least partially enclosing a tubular inner wall of the second joint member, and the tubular inner wall of the second joint member at least partially enclosing an inner cavity of the second joint member.

The method further includes positioning a first portion of a fastener within the inner cavity of the first joint member and positioning a second portion of the fastener within the inner cavity of the second joint member such that the fastener simultaneously extends through: a first opening of the inner cavity of the first joint member, a second opening of the inner cavity of the first joint member, a first opening of the inner cavity of the second joint member, and a second opening of the inner cavity of the second joint member. The fastener is elongate along an axis that extends through both the first portion of the fastener and the second portion of the fastener.

The method further includes accessing the fastener through an opening formed by the tubular outer wall of the first joint member, wherein the opening formed by the tubular outer wall of the first joint member provides a path to the fastener along a direction perpendicular to the axis. While accessing the fastener through the opening formed by the tubular outer wall of the first joint member, the method includes actuating the fastener thereby applying compression to both the first joint member and the second joint member.

According to one aspect of the disclosure a method of securing a plurality of hollow structural section members includes securing a hollow structural section column to a tubular outer wall, and securing a bracket to the tubular outer wall such that a first bracket through hole extends through a first portion of the bracket along an axis that is parallel to a first direction, and such that a second bracket through hole extends through a second portion of the bracket along an axis that is parallel to a second direction and perpendicular to the first direction. The method further includes securing a sleeve to the bracket such that a first sleeve through hole extends through a first portion of the sleeve along an axis that is parallel to the first direction by aligning a second sleeve through hole with the second bracket through hole and inserting a pin through the aligned second sleeve through hole and the second bracket through hole.

The method further includes securing a yield plate to the bracket such that a first plate through hole extends through a first portion of the yield plate along an axis that is parallel to the first direction by aligning the first plate through hole with the first bracket through hole and inserting a fastener through the aligned first plate through hole and the first bracket through hole, and securing the yield plate to the sleeve such that a second plate through hole extends through a second portion of the yield plate along an axis that is parallel to the first direction by aligning the second plate through hole with the first sleeve through hole and inserting a fastener through the aligned second plate through hole and the first sleeve through hole. The method further includes securing a first hollow structural section beam to a third portion of the sleeve.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

FIG. 18 is an isometric view of a connector, according to one embodiment.

FIG. 19 is an enlarged view of a portion of the connector illustrated in FIG. 18.

DETAILED DESCRIPTION

Figure 1:
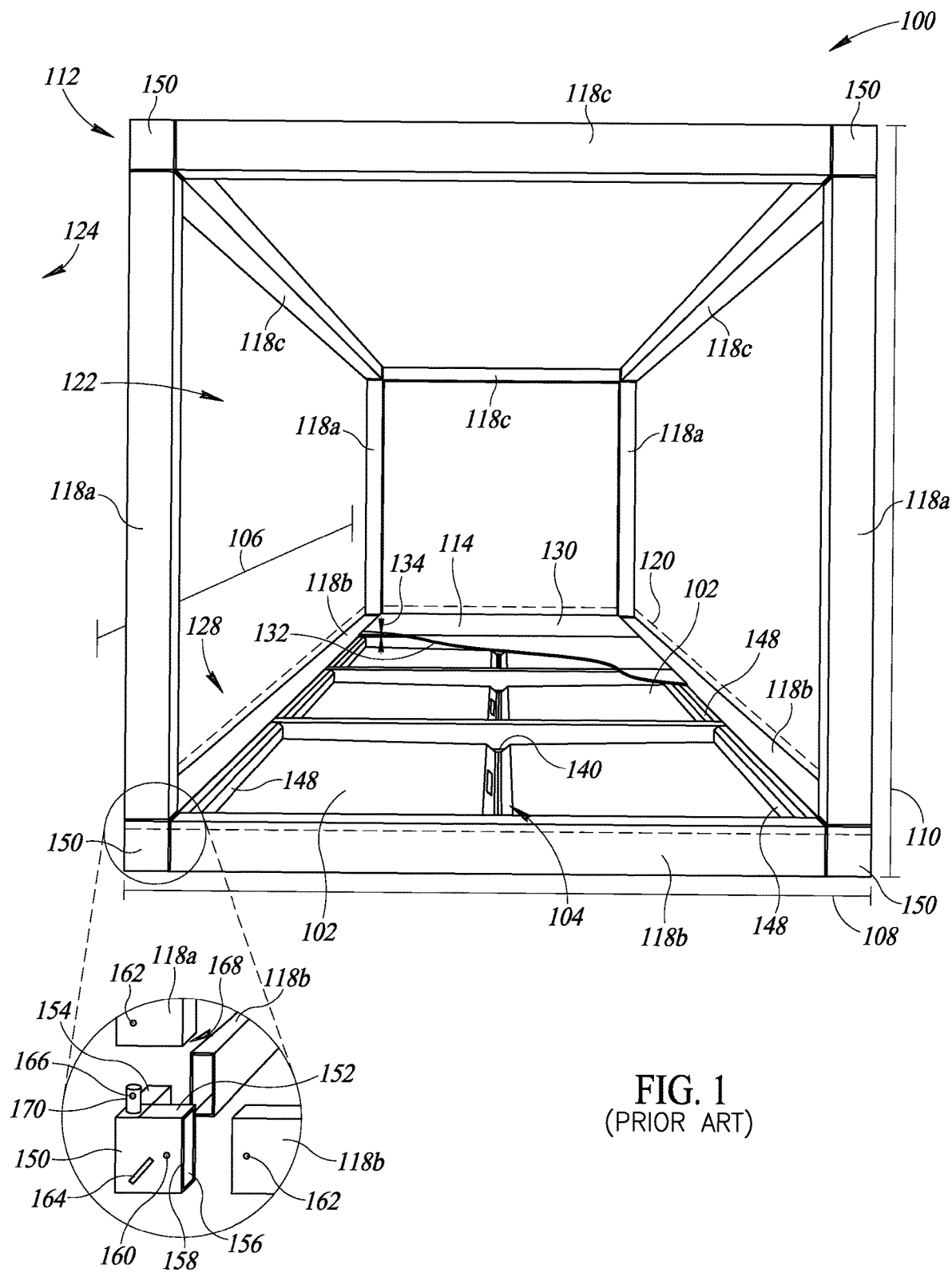
FIG. 1 is a front, perspective view of a known modular structure.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with connectors used in the construction of modular structures have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," "an embodiment," or "an aspect of the disclosure" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Reference herein to two elements "facing" or "facing toward" each other indicates that a straight line can be drawn from one of the elements to the other of the elements without contacting an intervening solid structure. Reference herein to two elements being "directly coupled" indicates that the two elements physically touch with no intervening structure between. Reference herein to a direction includes both vectors that make up said direction. For example a vertical direction includes both an "up" vector and a "down" vector, which is opposite the "up" vector. Reference to an element extending along a direction means the element extends along one or both of the vectors that make up the direction.

The term "between" as used herein in reference to a first element being between a second element and a third element with respect to a direction means that the first element is closer to the second element as measured along the direction than the third element is to the second element as measured along the direction. The term "between" includes, but does not require that the first, second, and third elements be aligned along the direction.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure.

The headings and Abstract of the Disclosure provided herein are for convenience only and do not interpret the scope or meaning of the embodiments.

Figure 2:
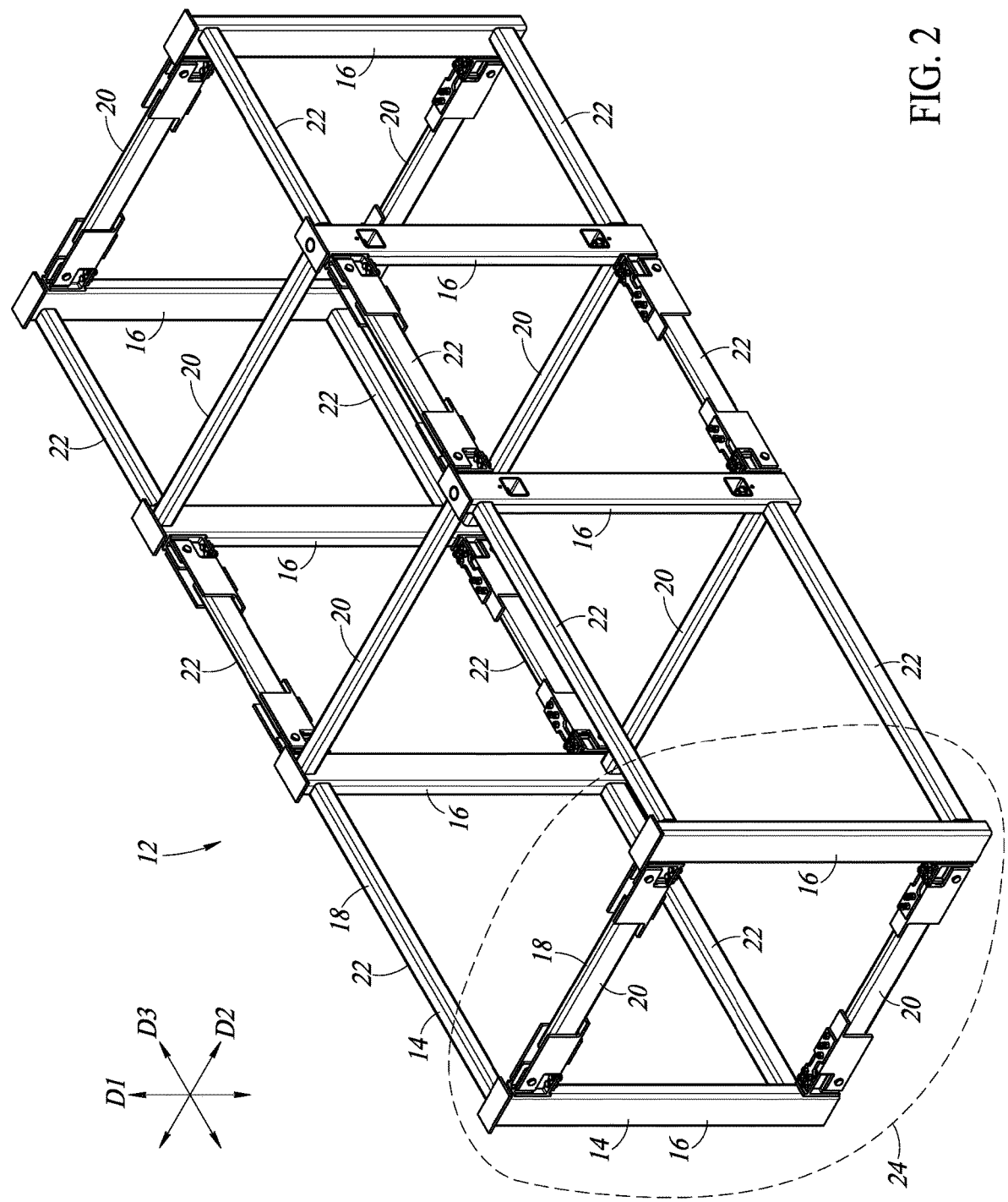
FIG. 2 is an isometric elevation view of a structural frame according to one embodiment.

Referring to FIG. 2, a structural frame 12 has a three-dimensional shape (e.g., a rectangular prism, a cube, or a cuboid). The structural frame 12 may include a plurality of structural members 14. As shown, the plurality of structural members 14 may include vertical structural members 16 (also referred to herein as columns) and horizontal structural members 18 (also referred to herein as beams). According to one aspect of the disclosure, at least some of the plurality of structural members 14 may be tubular members (e.g. hollow structural sections).

One or more of the vertical structural members 16 may be arranged such that the vertical structural members 16 are elongate along a first direction D1, for example a vertical direction (e.g., the direction perpendicular to the surface upon which the structural frame 12 rests). One or more of the horizontal structural members 18 may include lateral structural members 20 and longitudinal structural members 22. The lateral structural members 20 may be elongate along a second direction D2, which may be perpendicular to the first direction D1. The longitudinal structural members 22 may be elongate along a third direction D3, which may be perpendicular to at least one of, for example both, the first direction D1 and the second direction D2.

The plurality of structural members 14 within the structural frame 12 may be different lengths. For example, the length of the vertical structural members 16 as measured along the first direction D1 may be different than the length of one or both of the lateral structural members 20 as measured along the second direction D2 and the longitudinal structural members 22 as measured along the third direction D3. According to another embodiment, the length of the vertical structural members 16 as measured along the first direction D1 may be the same as the length of one or both of the lateral structural members 20 as measured along the second direction D2 and the longitudinal structural members 22 as measured along the third direction D3.

According to one embodiment, each of the vertical structural members 16 within the structural frame 12 may be the same length so as to establish a constant height of the structural frame 12. Similarly, each of the lateral structural members 20 within the structural frame 12 may be the same length so as to establish a constant width of the structural frame 12. Similarly, each of the longitudinal structural members 22 within the structural frame 12 may be the same length so as to establish a constant depth of the structural frame 12.

It will be understood that one or more of the vertical structural members 16 may be a different length compared to others of the vertical structural members 16 within the structural frame 12 to establish a varying height of the structural frame 12. Similarly, one or more of the lateral structural members 20 may be a different length compared to others of the lateral structural members 20 within the structural frame 12 to establish a varying width of the structural frame 12. Similarly, one or more of the longitudinal structural members 22 may be a different length compared to others of the longitudinal structural members 22 within the structural frame 12 to establish a varying depth of the structural frame 12.

The structural blocks 12 may be described as including a number, for example 2 or more, moment frames 24. Each of the moment frames 24 may include two or more moment connections. According to one embodiment, a moment connection is a joint that allows the transfer of bending moment forces between two members, such as a column and a beam. Members of the moment frame 24 are rigidly connected, for example by welding or a connector, so as to resist bending moments and shear forces applied to the modular structure 10.

The moment frames 24, as shown, may include two of the vertical structural members 16 each coupled to two of the horizontal structural members 18 by a moment connection. Thus, according to one embodiment, the moment frame 24 may include four moment connections. It will be appreciated by those of skill in the art that the moment frame 24 may include other numbers of members and moment connections. For example, the moment frame 24 may be in the form of a goalpost having two of the vertical structural members 16 and one of the horizontal structural members 18 and two moment connections joining the horizontal structural member 18 to both of the vertical structural members 16.

According to one embodiment, the structural frame 12 may include a series of moment frames 24 that each include a pair of the vertical structural members 16 and a pair of the lateral structural members 20 connecting the pair of the vertical structural members 16. Adjacent ones of the series of moment frames 24 may be connected by a plurality, for example four, of the longitudinal structural members 22. According to one embodiment, the longitudinal structural members 22 connecting adjacent ones of the moment frames 24 may be non-rigidly connected, for example by friction fit or protrusion and recess, to the adjacent moment frames 24.

As shown, the moment frame 24 may be in the form of a closed shape, such as a square tube 26, that includes two vertical structural members 16, and two horizontal structural members 18, for example two lateral structural members 20, each coupled to both of the two vertical structural members 16. According to one embodiment the modular structure 10 may include a plurality of the moment frames 24.

The structural frame 12 may include one or more connectors 30 that attach and secure one of the vertical structural members 16 to at least one of the horizontal structural members 18. According to one embodiment, some of the vertical structural members 16 may be joined to an adjacent horizontal structural members 18 with one of the connectors, while others of the adjacent horizontal structural members 18 may be joined by another method (e.g., directly welding the two members). According to another embodiment, one or more of the vertical structural members 16 may be joined to all of the adjacent horizontal structural members 18 with respective ones of the connectors 30.

Figure 3:
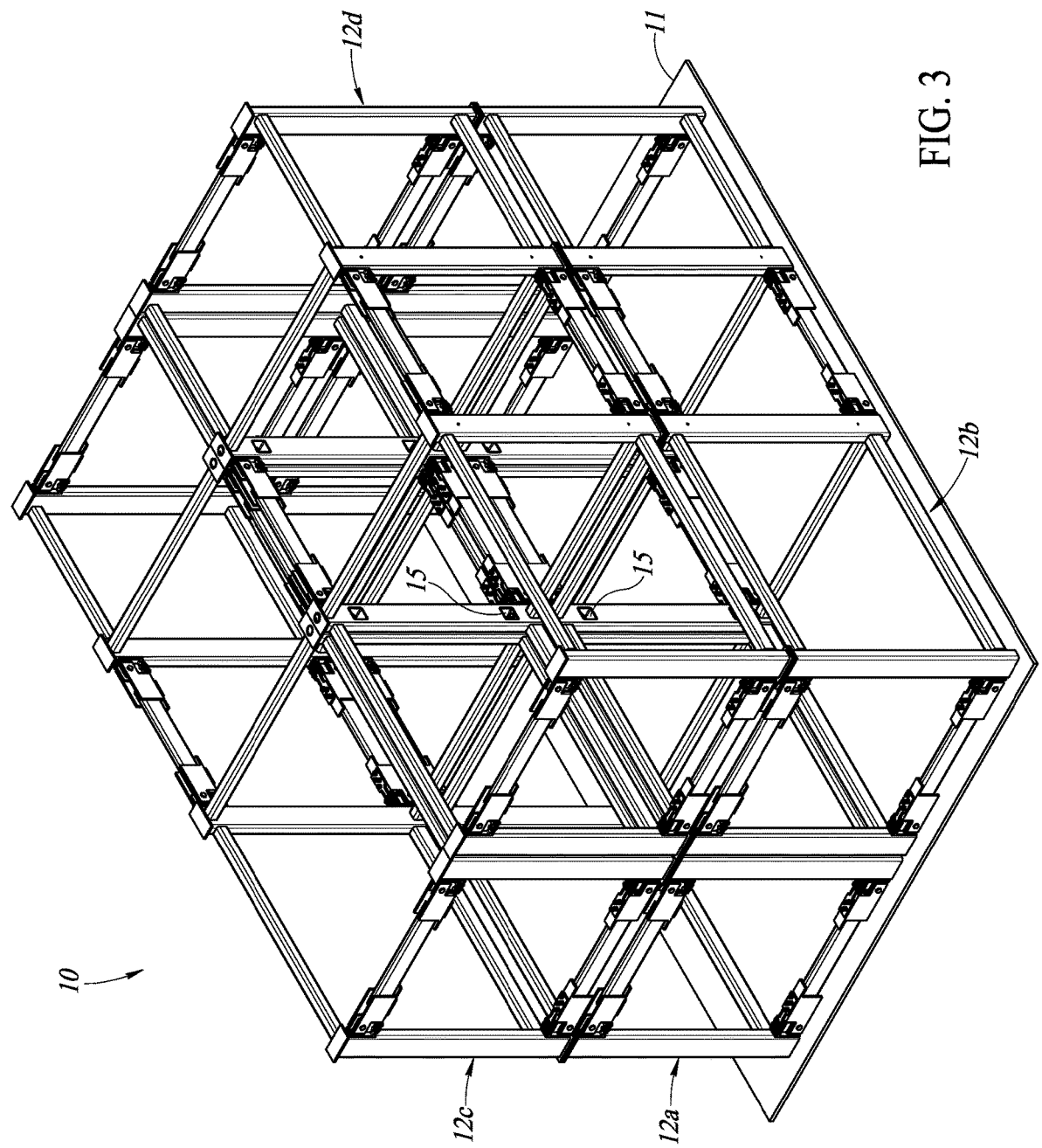
FIG. 3 is an isometric view of a modular structure that includes a plurality of the structural frames illustrated in FIG. 2.
Figure 4:
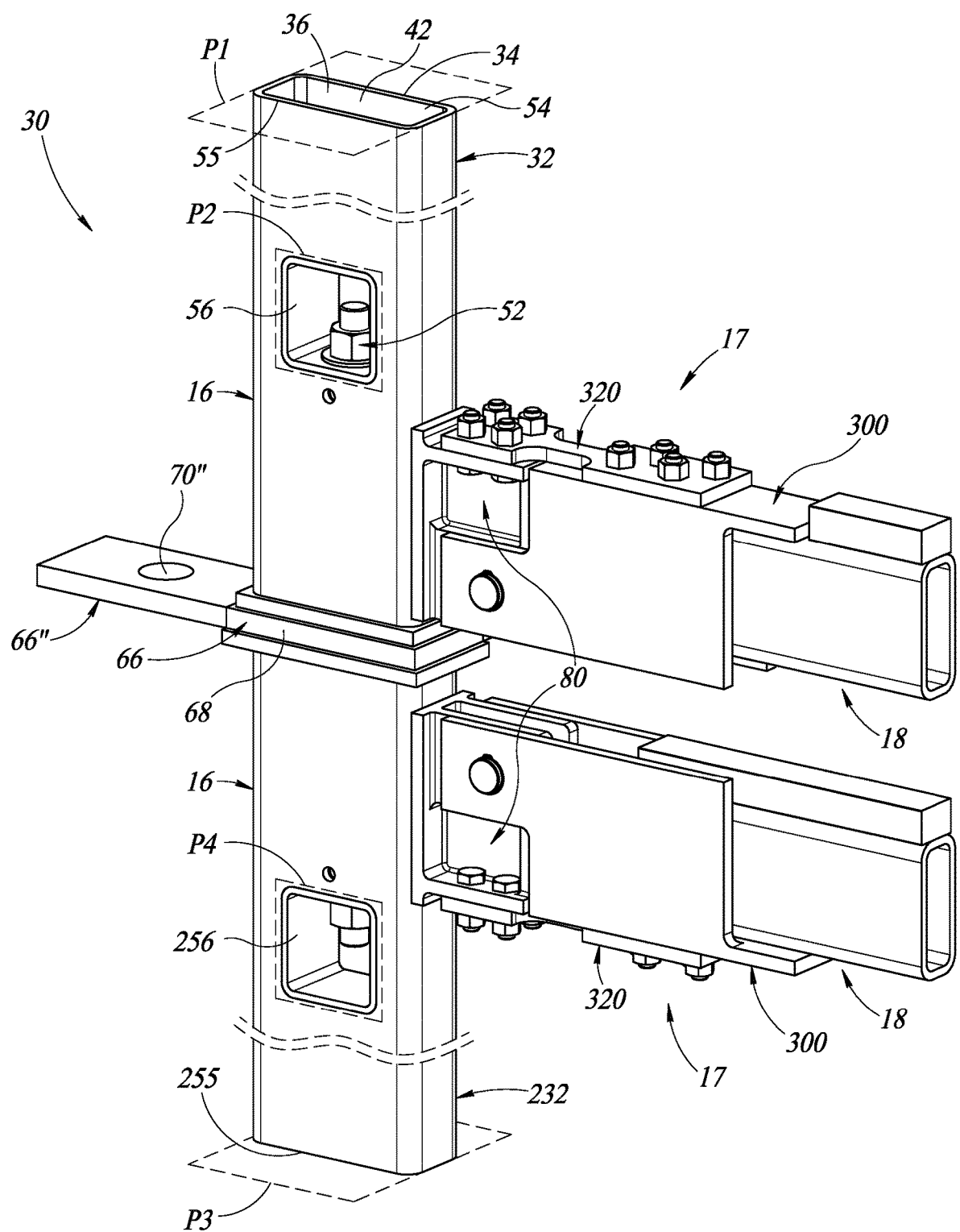
FIG. 4 is an isometric view of a connector, according to one embodiment.
Figure 5:
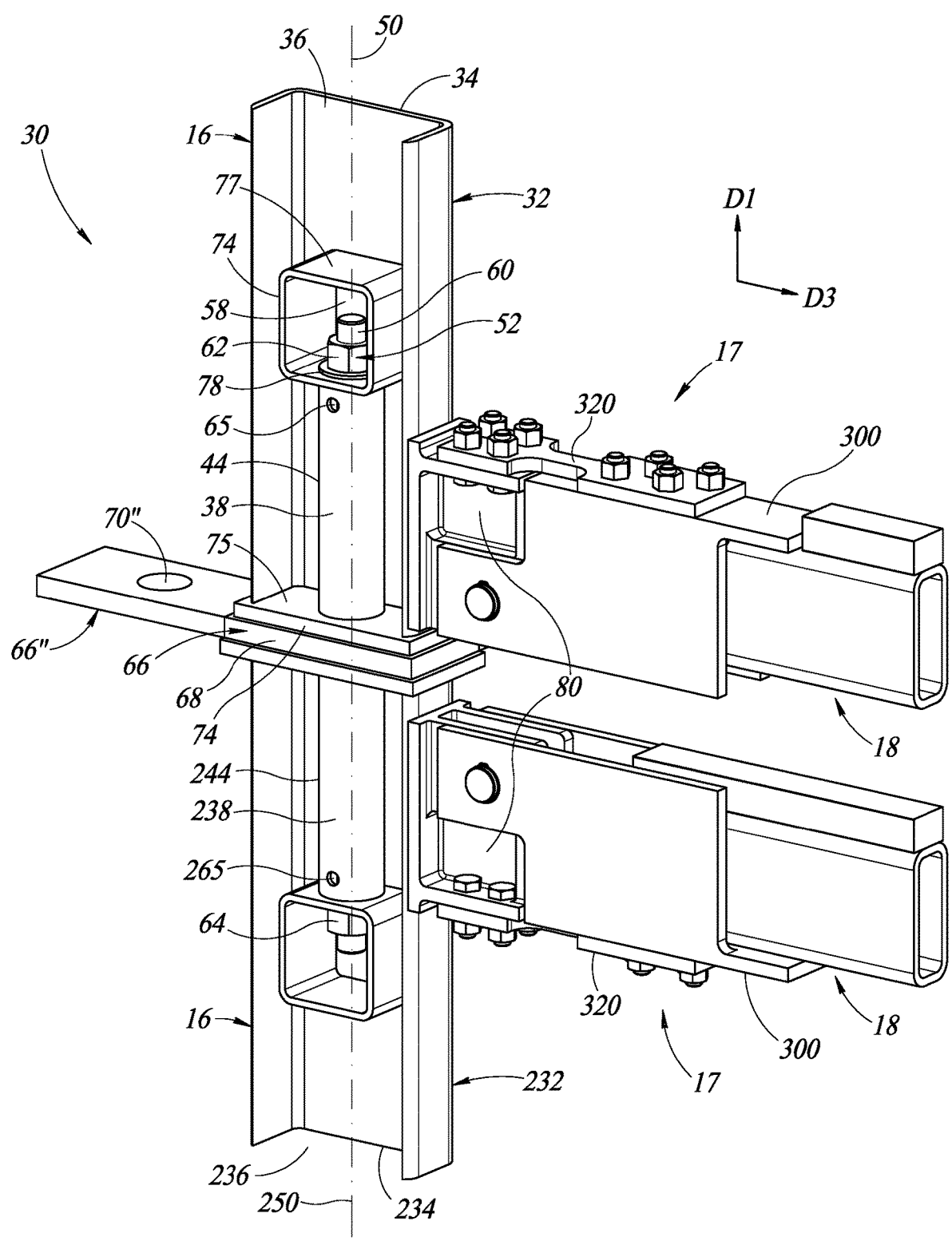
FIG. 5 is an isometric view of the connector illustrated in FIG. 4 with selected exterior surfaces removed to better show the arrangement of internal components within the connector.

Referring to FIGS. 2 and 3, a plurality of the structural blocks 12 may be positioned and secured relative to one another to assemble a modular structure 10. According to one embodiment, a first structural frame 12a may be delivered to a location (e.g., as an assembled unit) and secured in a desired position. For example, a base plate 11 (e.g., a metal base plate) may be present at the location, and the first structural frame 12a may be secured (e.g., welded) to it. According to one embodiment, one or more of the vertical structural members 16 (e.g., the bottom of all eight of the vertical structural members 16 shown), may be welded to the metal base plate or otherwise secured to the ground.

A second structural frame 12b may be secured adjacent to the first structural frame 12a. The second structural frame 12b may be secured (e.g., welded) to the metal base plate as the first structural frame 12a. According to one embodiment, one or more of the vertical structural members 16 (e.g., the bottom of up to six of the vertical structural members 16 shown), may be welded to the metal base plate or otherwise secured to the ground. Note that the two middle vertical structural members 16 that face the first structural frame 12a may not be accessible to secure to the metal base plate (e.g., if a floor, such as the floor 114 in FIG. 1, is already installed that covers the bottom of the vertical structural members 16).

The second structural frame 12b may be secured directly to the first structural frame 12a. According to one embodiment, a top of at least one pair of the vertical structural members 16 of the first structural frame 12a and the second structural frame 12b may be secured (e.g., welded) to one another. For example, the adjacent vertical structural members 16 that make up the four pairs of vertical structural members 16 may be welded together.

A third structural frame 12c may be secured on top of the first structural frame 12a. According to one embodiment, a bottom of at least one of the vertical structural members 16 of the third structural frame 12c may be secured (e.g., welded) to a top of at least one of the vertical structural members 16 of the first structural frame 12a. As shown, all (e.g., four, six, eight, etc.) of the vertical structural members 16 of the third structural frame 12c may be secured to a vertically adjacent, respective one of the vertical structural members 16 of the first structural frame 12a.

A fourth structural frame 12d may be secured on top of the second structural frame 12b. According to one embodiment, a bottom of at least one of the vertical structural members 16 of the fourth structural frame 12d may be secured (e.g., welded) to a top of at least one of the vertical structural members 16 of the second structural frame 12b. However, after placement of the fourth structural frame 12d on top of the second structural frame 12b, a junction of some of the vertical structural members 16 of the third structural frame 12c and the respective ones of the vertically adjacent vertical structural members 16 of the second structural frame 12b may be inaccessible (also referred to herein as a blind connection location).

Thus, one embodiment of the connector 30 may include components 15 (described in further detail below) that facilitate coupling blind pairs of adjacent vertical structural members 16 from vertically stacked structural blocks 12. As shown, the components that facilitate these blind couplings may be absent from one embodiment of the structural frame 12 (e.g., the first structural frame 12a and the third structural frame 12c) and present in another embodiment of the structural frame 12 (e.g., the second structural frame 12b and the fourth structural frame 12d) within the modular structure 10.

Referring to FIGS. 4 to 9, the connector 30 may include a first joint member 32. The first joint member 32 may include an outer wall (e.g., a tubular outer wall 34) and an outer cavity 36 that is at least partially enclosed within the tubular outer wall 34. The first joint member 32 may further include an inner wall (e.g., a tubular inner wall 38) positioned within the outer cavity 36, and an inner cavity 40 at least partially enclosed within the tubular inner wall 38 such that at least a portion of an inner surface 42 of the tubular outer wall 34 faces at least a portion of an outer surface 44 of the tubular inner wall 38. The tubular inner wall 38 may form a first opening 46 of the inner cavity 40 and a second opening 48 of the inner cavity 40. As shown, the first opening 46 may be spaced from the second opening 48 along an axis 50 that extends in a direction (e.g., the first direction D1).

The connector 30 may include a second joint member 232. According to one embodiment, the second joint member 232 may be identical to the first joint member 32. According to one embodiment, the second joint member 232 may be similar to the first joint member 32 in that one or more components of the second joint member 232 are identical to corresponding components of the first joint member 32. As shown in the illustrated embodiment, the first joint member 32 and the second joint member 232 may be coupled such that one of the first joint member 32 and the second joint member 232 is oriented upside-down relative to the other of the first joint member 32 and the second joint member 232.

The connector 30 including first and second joint members 32, 232 with one or more identical components may result in increased efficiency through a reduced parts list, lower manufacturing costs, and more efficient assembly of the connector 30 as components are interchangeable.

The second joint member 232 may include an outer wall (e.g., a tubular outer wall 234) and an outer cavity 236 that is at least partially enclosed within the tubular outer wall 234. The second joint member 232 may further include an inner wall (e.g., a tubular inner wall 238) positioned within the outer cavity 236, and an inner cavity 240 at least partially enclosed within the tubular inner wall 238 such that at least a portion of an inner surface 242 of the tubular outer wall 234 faces at least a portion of an outer surface 244 of the tubular inner wall 238. The tubular inner wall 238 may form a first opening 246 of the inner cavity 240 and a second opening 248 of the inner cavity 240. As shown, the first opening 246 may be spaced from the second opening 248 along an axis 250, which may be collinear with the axis 50 when the first joint member 32 is coupled to the second joint member 232.

The connector 30 may include a fastener 52 that positions the first joint member 32 and the second joint member 232 relative to one another and secures the first joint member 32 and the second joint member 232 inhibiting relative movement of the first joint member 32 and the second joint member 232. As shown, the fastener 52 may extend through each of the first opening 46, the second opening 48, the first opening 246, and the second opening 248, simultaneously to vertically align one or more sets of corresponding components of the first joint member 32 and the second joint member 232 (e.g., the tubular outer walls 34 and 234, the tubular inner walls 38 and 238, etc.).

As described above in reference to FIGS. 2 and 3, the tubular inner walls 38, 238 and the fastener 52 may be part of the components 15 that facilitate a blind coupling of the first joint member 32 and the second joint member 232. Thus, embodiments of the connector 30 may be devoid of the tubular inner walls 38, 238 and the fastener 52.

According to one embodiment, the tubular outer wall 34 of the first joint member 32 may form a first opening 54 of the outer cavity 36. As shown, the first opening 54 may be formed within a first plane P1 that is normal to the axis 50. According to one embodiment, the first opening 54 is formed by a terminal end 55 of the tubular outer wall 34. The tubular outer wall 34 may form a second opening 56 of the outer cavity 36, and the second opening 56 of the outer cavity 36 may be formed within a second plane P2 that is perpendicular to the first plane P1. The tubular outer wall 34 may further form a third opening 58 of the outer cavity 36. As shown, the third opening 58 may be spaced from the second opening 56 in a direction normal to the second plane P2 and formed within a plane parallel to the second plane P2.

According to one embodiment, the tubular outer wall 234 of the second joint member 232 may form a first opening 254 of the outer cavity 236. As shown, the first opening 254 may be formed within a third plane P3 that is parallel to the axis 250. As shown, when the first joint member 32 is secured to the second joint member 232, the first plane P1 may be parallel to the third plane P3. According to one embodiment, the first opening 254 is formed by a terminal end 255 of the tubular outer wall 234. The tubular outer wall 234 may form a second opening 256 of the outer cavity 236, and the second opening 256 of the outer cavity 236 may be formed within a fourth plane P4 that is perpendicular to the third plane P3.

As shown, when the first joint member 32 is secured to the second joint member 232, the fourth plane P4 may be coplanar with the second plane P2, such that the second opening 256 is formed within the second plane P2. The tubular outer wall 234 may further form a third opening 258 of the outer cavity 236. As shown, the third opening 258 may be spaced from the second opening 256 in a direction normal to the fourth plane P4 and formed within a plane parallel to the fourth plane P4. When the first joint member 32 is secured to the second joint member 232 the third opening 58 and the third opening 258 may be coplanar.

The fastener 52 may include at least one actuator that is rotatable about an axis (e.g., the axis 50) to apply compression to the first joint member 32 and the second joint member 232. According to one embodiment, the fastener 52 may include an externally threaded rod 60 and the at least one actuator may include a first internally threaded nut 62. As shown, the first internally threaded nut 62 may be threaded onto the externally threaded rod 60 and positioned at a location spaced radially inward from the second opening 56 of the outer cavity 36 with respect to the axis 50. In other words, a radial ray that extends perpendicularly from the axis 50 that intersects both the threaded nut 62 and the second opening 56, will intersect the threaded nut 62 first, and then intersect the second opening 56. The at least one actuator may include a second internally threaded nut 64 threadable onto the externally threaded rod 60 so as to be positioned at a location spaced radially inward from the second opening 256 of the outer cavity 236 with respect to the axis 250.

As shown, the second and third openings 56, 58 may be positioned above a lateral coupler 17 (described in greater detail below) of the connector 30 that is secured to the first joint member 32, and the second and third openings 256, 258 may be positioned below another lateral coupler 17 of the connector 30 that is secured to the second joint member 232. This positioning provides access to the first and second threaded nuts 62, 64 even if the first and second joint members 32, 232 are internal vertical structural members 16 (i.e., facilitates a blind coupling of the first and second joint members 32, 232). Once again, the connector 30 may be devoid of the second openings 56, 256 and the third openings 58, 258.

According to one embodiment, a cross-sectional area of the inner cavity 40 is greater than a cross-sectional area of the fastener 52. This size difference may result in an ease of assembly by increasing the tolerances associated with properly aligning the first joint member 32 and the second joint member 232. If the cross-sectional areas of the inner cavity 40 and the fastener 52 are roughly equal, there is little tolerance available in which the fastener 52 will fit through both the inner cavities 40, 240. As the size of the inner cavities 40, 240 increase relative to the size of the fastener 52, additional tolerance is provided.

However, a gap between the fastener 52 and the tubular inner walls 38, 238 may be undesirable once the first and second joint members 32, 232 are connected as the gap allows lateral movement/shear forces to be imparted on the connector 30. Thus, according to one embodiment, the difference in cross-sectional areas may be large enough to form a gap between the fastener 52 and the tubular inner walls 38, 238 large enough to receive a material therein. According to one embodiment, the material may be a loose, filler material (e.g. gravel).

The tubular inner walls 38, 238 may form a third opening 65, 265 of the inner cavity 40, 240 that is positioned between the first opening 54, 254 of the inner cavity 40, 240 and the second opening 56, 256 of the inner cavity 40, 240 with respect to the first direction D1. The third opening 65, 265 may extend through the tubular inner wall 38, 238 in a direction perpendicular to the first direction D1. The loose, filler material may fill the space between the fastener 52 and the tubular inner walls 38, 238 thereby eliminating the gap and the resultant lateral movement/shear forces.

As shown, the connector 30 may include a third joint member 66 positioned between the first joint member 32 and the second joint member 232 with respect to the first direction D1. The third joint member 66 may include a body 68 (e.g., a plate) and at least one through hole (e.g., a first through hole 70). The body 68 may include opposed planar surfaces that each of the at least one through hole extends through. According to one embodiment, the body 68 may be a monolithic construct.

Figure 6:
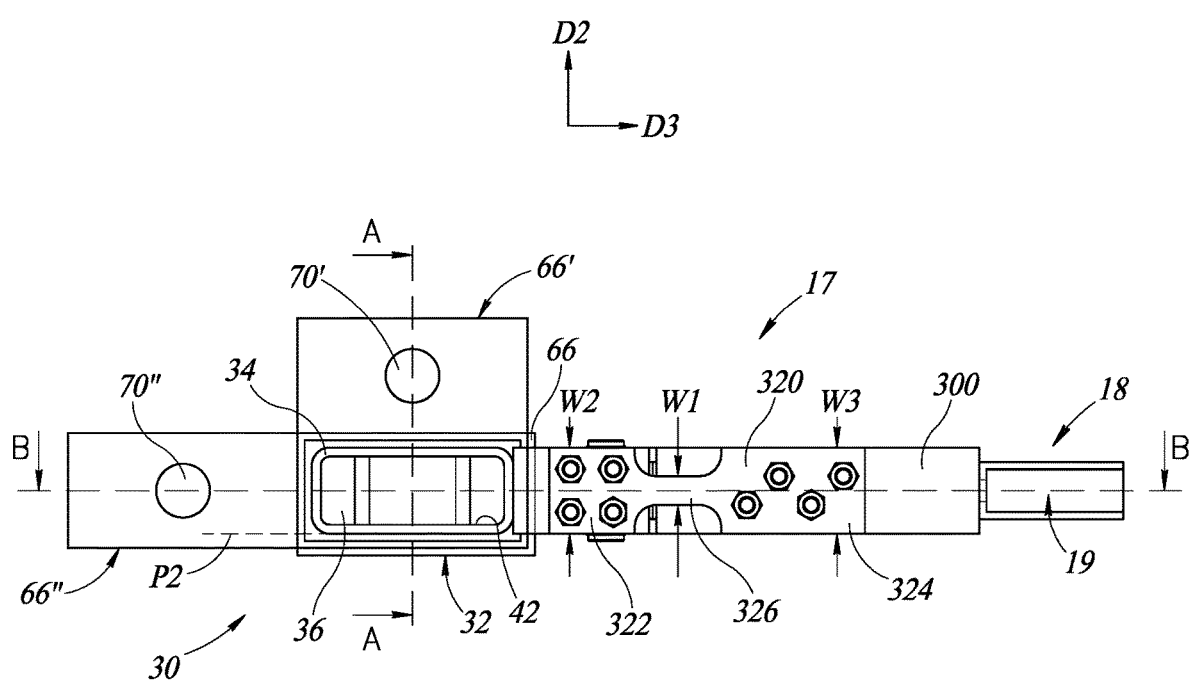
FIG. 6 is a top plan view of the connector illustrated in FIG. 4.
Figure 7:
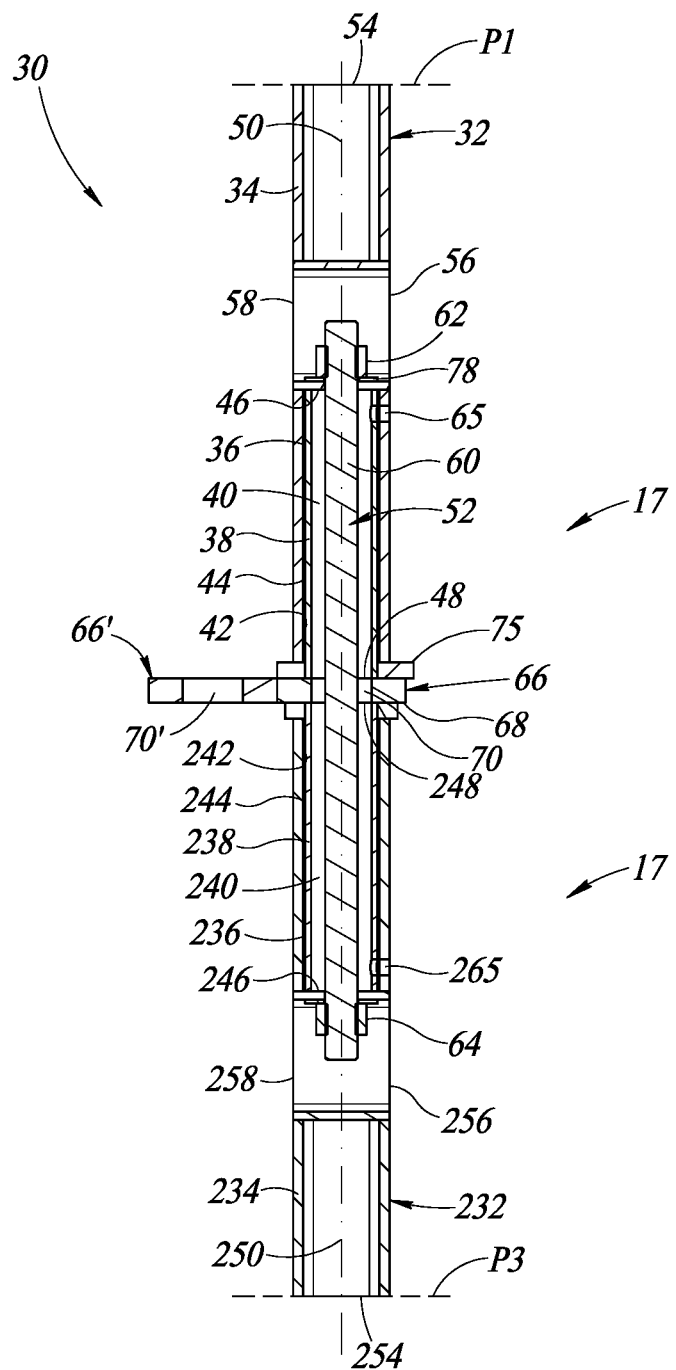
FIG. 7 is a cross-sectional view of the connector illustrated in FIG. 4, along line A-A of FIG. 6.
Figure 8:
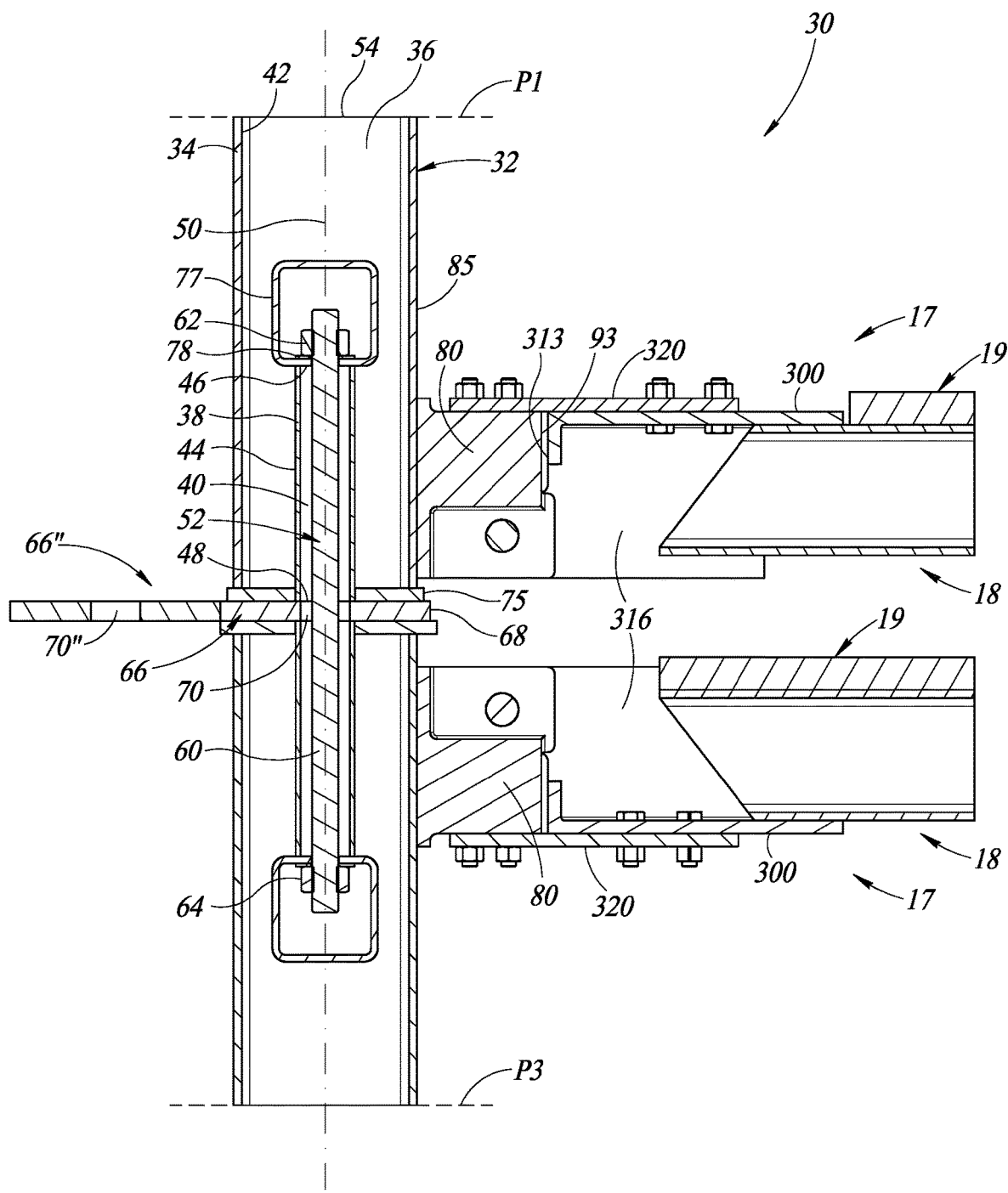
FIG. 8 is a cross-sectional view of the connector illustrated in FIG. 4, along line B-B of FIG. 6.
Figure 9:
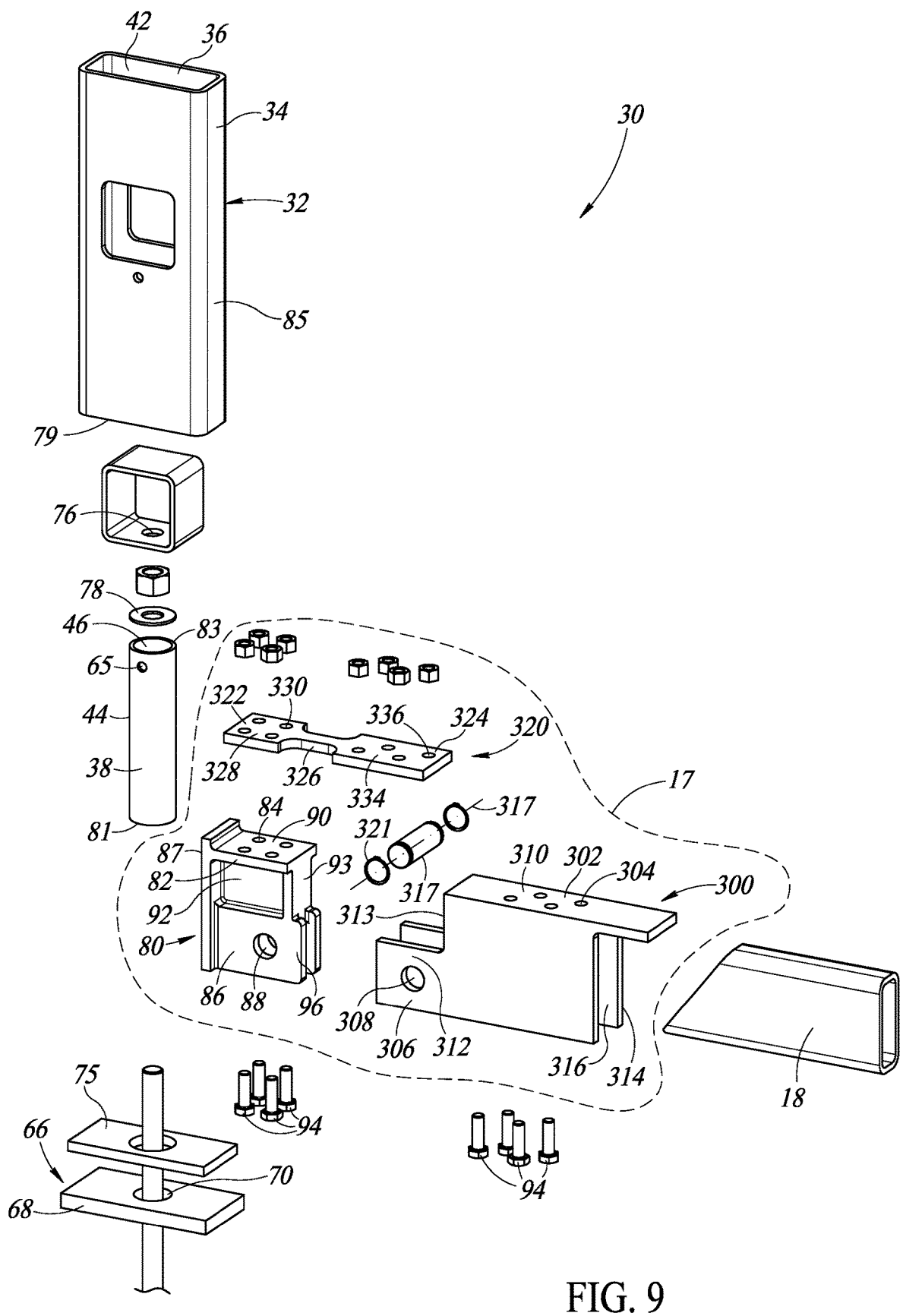
FIG. 9 is an exploded view of a first joint body of the connector illustrated in FIG. 4.

According to one embodiment, adjacent ones of the connector 30 may be joined by welding the third joint member 66 of one of the adjacent connectors 30 to a third joint member 66' of the adjacent connector 30 (as shown in FIG. 3). As shown in FIG. 6, the third joint member 66 may be coupled (e.g., welded) to multiple adjacent connectors 30 (e.g., via their respective third joint members 66', 66").

The first through hole 70, 70', 70" of each of the respective third joint member(s) 66, 66', 66" may each be sized to receive at least a portion of a respective one of the fastener 52 (e.g., the threaded rod 60) therethrough. As shown, the first through hole 70' may be spaced from the first through hole 70 in a direction that is perpendicular to the axis 50 and the first direction D1 (e.g., the second direction D2), so as to couple adjacent ones of the connector 30 as described in further detail below. As shown, the first through hole 70" may be spaced from the first through hole 70 in a direction that is perpendicular to the both the first direction D1 and the second direction D2 (e.g., the third direction D3), so as to couple adjacent ones of the connector 30 as described in further detail below.

The first joint member 32 may include one or more supports 74 that extends from one portion of the inner surface 42 of the tubular outer wall 34 to either another portion of the inner surface 42 of the tubular outer wall 34, the tubular inner wall 38, or both another portion of the inner surface 42 of the tubular outer wall 34 and the tubular inner wall 38. As shown, the one or more supports 74 may span a portion of the outer cavity 36 by connecting to opposite surfaces of the tubular outer wall 34. The connector 30, according to one embodiment, may be devoid of the third joint member 66 such that the first and second joint members 32, 232 are directly coupled (e.g., welded).

According to one embodiment, the one or more supports 74 includes a base support 75 and an intermediate support 77. The base support 75 may be coupled (e.g., welded, glued, fastened, etc.) to a first terminal end 79 of the tubular outer wall 34. The base support 75 may further be coupled (e.g., welded, glued, fastened, etc.) to a first terminal end 81 of the tubular inner wall 38.

The intermediate support 77 may include an opening 76 that is aligned with the first opening 46 so as to allow the fastener 52 to extend therethrough. According to one embodiment, the intermediate support 77 abuts the tubular inner wall 38 (e.g., a second, or upper, terminal end 83 of the tubular inner wall 38) that forms the first opening 46. Thus, rotation of the first internally threaded nut 62 about the axis 50 may apply compression to the intermediate support 77 either directly or indirectly (e.g., via a spacer 78). According to one embodiment, the intermediate support 77 at least partially corresponds in shape to the second opening 56 of the outer cavity 36. The second joint member 232 may include one or more supports, similar to the one or more supports 74 as described above. The connector 30, according to one embodiment, may be devoid of the intermediate support 77 (e.g., when the connector 30 is not facilitating a blind connection).

The connector 30 (e.g., the first joint member 32) may include a lateral coupler 17 that secures one of the horizontal structural members 18 (e.g., an HSS beam) to the tubular outer wall 34. According to one embodiment, the lateral coupler 17 includes a bracket 80 that extends away from a first outer surface 85 of the tubular outer wall 34 in a direction that is perpendicular to the first direction D1 (e.g., the second direction D2, or the third direction D3). According to one embodiment, the bracket 80 includes a surface 87 that abuts and may be attached (e.g., welded) to the outer surface 85 of the tubular outer wall 34. The bracket 80 may include a first portion 82 and one or more through holes 84 that extend through the first portion 82 along respective axes (e.g., that are parallel to the axis 50). The bracket 80 may include a second portion 86 and a through hole 88 that extends through the second portion 86 along an axis (e.g., that is perpendicular to the axis 50, the respective axes of the one or more through holes 84, or both the axis 50 and the respective axes of the one or more through holes 84).

As shown the first portion 82 may include a planar surface 90 that forms the one or more through holes 84. The one or more or more of the through holes 84 (e.g., adjacent pairs of the through holes 84) may be arranged in a regular formation, such that each of the through holes 84 of the adjacent pair are at an equal radial distance from the axis 50 when the bracket 80 is secured relative to the tubular outer wall 34. According to another embodiment, through holes 84 may be arranged in a staggered formation, such that no two of the one or more through holes 84 are at an equal radial distance from the axis 50 when the bracket 80 is secured relative to the tubular outer wall 34.

The first portion 82 may further include a neck 92 that extends between the planar surface 90 and the second portion 86. The neck 92 may be positioned relative to the at least one through hole 84 such that fasteners 94 inserted into a pair of adjacent ones of the at least one through hole 84 are positioned on opposite sides of the neck 92. As shown the second portion 86 may include a pair of planar surfaces 96 that each form an opening of the through hole 88. The pair of planar surfaces 96 may be parallel to one another and perpendicular to the planar surface 90. The pair of planar surfaces 96 may include a small draft (e.g. less than 5°, such as 2° or less). The bracket 80 may include a planar surface 93 that is perpendicular to both the planar surface 90 and the pair of planar surfaces 96.

The lateral coupler 17 may include a sleeve 300. As shown the sleeve 300 may extend away from the bracket 80 in a direction that is perpendicular to the first direction D1. The sleeve 300 may include a first portion 302 and one or more through holes 304 that extend through the first portion 302 along respective axes (e.g., that are parallel to the axis 50 when the sleeve 300 is secured relative to the tubular outer wall 34). The sleeve 300 may include a second portion 306 and a through hole 308 that extends through the second portion 306 along an axis (e.g., that is perpendicular to the axis 50, the respective axes of the one or more through holes 304, or both the axis 50 and the respective axes of the one or more through holes 304).

As shown the first portion 302 may include a planar surface 310 that forms the one or more through holes 304. The one or more through holes 304 may be arranged in a staggered formation, such that no two of the one or more through holes are at an equal radial distance from the axis 50 when the sleeve 300 is secured relative to the tubular outer wall 34. According to another embodiment, one or more of the through holes 304 (e.g., adjacent pairs of the through holes 304) may be arranged in a regular formation, such that each of the through holes 304 of the adjacent pair are at an equal radial distance from the axis 50 when the sleeve 300 is secured relative to the tubular outer wall 34.

The second portion 306 may include a pair of planar surfaces 312 that each form an opening of the through hole 308. The pair of planar surfaces 312 may be parallel to one another and perpendicular to the planar surface 310. The pair of planar surfaces 96 may include a small draft (e.g. less than 5°, such as 2° or less). The sleeve 300 may include a third portion 314 that engages with the horizontal structural member 18. According to one embodiment, the third portion 314 includes one or more planar surfaces 316 (e.g., a pair of opposed, planar surfaces that are perpendicular to the planar surface 310). The one or more planar surfaces 316 may include internal surfaces that face one another, as shown, so as to abut exterior surfaces of the horizontal structural member 18. According to another embodiment, the one or more planar surfaces 316 may include external surfaces that face away from one another so as to abut interior surfaces of the horizontal structural member 18.

The third portion 314 and the one or more planar surfaces 316 may receive a nailer 19 (e.g., a wooden beam capable of receiving fasteners such as nails, screws, etc. more easily and holding said fasteners more reliably than a corresponding metal component, such as the horizontal structural member 18). Alternatively, the nailer 19 may be positioned on top of the horizontal structural member 18 such that the nailer 19 is not captured between the one or more planar surfaces 316.

The lateral coupler 17 may include a pin 317 insertable through both the through hole 88 and the through hole 308. According to one embodiment, the pin 317 is positionable within both the through hole 88 and the through hole 308 simultaneously, thereby rotatably coupling the bracket 80 and the sleeve 300, such that the sleeve 300 is rotatable relative to the bracket 80 about a central axis 319 of the pin 317. The pin 317, according to one embodiment, may be secured within the through hole 88 and the through hole 308 by one or more locking rings 321.

The sleeve 300 may include a planar surface 313 that is perpendicular to both the planar surface 310 and the pair of planar, parallel, surfaces 312. The planar surface 313 may correspond to the planar surface 93 such that abutment of the planar surfaces 93, 313 blocks relative rotation of the bracket 80 and the sleeve 300 (e.g., during a failure event as described in detail below). According to one embodiment, when the sleeve 300 and the bracket 80 are rotatably coupled (e.g., by insertion of the pin 312 through both the through hole 88 and the through hole 308) the planar surface 93 and the planar surface 313 may be separated by a gap. The gap may be sized to allow some rotation of the sleeve 300 relative to the bracket 80 in a direction until the planar surfaces 93 and 313 abut, thereby preventing any further relative rotation in the direction.

The lateral coupler 17 may include a yield plate 320. According to one embodiment, the yield plate 320 may have a dog-bone shape (e.g., two wider ends and a thinner, intermediate, portion between the two ends). The yield plate 320 may have a first terminal end portion 322, a second terminal end portion 324, and an intermediate portion 326 between the first terminal end portion 322 and the second terminal end portion 324.

The intermediate portion 326 may have a width W1 measured perpendicular to a radial ray extending from the axis 50 when the lateral coupler 17 is secured relative to the tubular outer wall 34. The first terminal end portion 322 may have a width W2 measured in the same direction as the width W1 of the intermediate portion 326, and the second terminal end portion 324 may have a width W3 measured in the same direction as the width W1 of the intermediate portion 326. According to one embodiment, the width W1 is less than the width W2, and the width W1 is also less than the width W3. For example the width W1 may be half of the width W2. According to one embodiment, the width W1 and the width W3 are equal.

The first terminal end portion 322 may correspond to the first portion 82 of the bracket 80. For example, the first terminal end portion 322 may include a planar surface 328 that forms one or more through holes 330 that align with the one or more through holes 84 when the yield plate 320 is secured to the bracket 80 (e.g., when the planar surface 328 abuts the planar surface 90). As shown, the aligned through holes 84 and 330 may each receive a fastener (e.g., the fastener 94) that secures the yield plate 320 to the bracket 80. Similarly, the second terminal end portion 324 may correspond to the first portion 302 of the sleeve 300. For example, the second terminal end portion 324 may include a planar surface 334 that forms one or more through holes 336 that align with the one or more through holes 304 when the yield plate 320 is secured to the sleeve 300 (e.g., when the planar surface 334 abuts the planar surface 310). As shown, the aligned through holes 304 and 336 may each receive a fastener (e.g., the fastener 94) that secures the yield plate 320 to the sleeve 300.

According to one embodiment, the lateral coupler 17 includes an assembled configuration in which a respective one of the fasteners 332 is inserted through each pair of aligned through holes 84 and through holes 330, the pin 317 is inserted through both the through hole 88 and the through hole 308, and a respective fastener (e.g., one of the fasteners 332) is inserted through each pair of aligned through holes 304 and through holes 336. The lateral coupler 17 (e.g., the bracket 80) may further include a planar surface 340 that abuts (e.g., is welded to) the tubular outer wall 34 to secure the lateral coupler 17 to the tubular outer wall 34.

The sleeve 300 (e.g., the third portion 314) may abut (e.g., be welded to) the horizontal structural member 18 to secure the lateral coupler 17 to the horizontal structural member 18. According to one embodiment, a portion of the horizontal structural member 18 may be removed (see the diagonal cut at the end of the horizontal structural member 18) to allow insertion of the horizontal structural member 18 into the sleeve 300 without interfering with insertion of the fasteners 94 through the through holes 304 and 336.

When the lateral coupler 17 is in the assembled configuration, the planar surface 340 is secured to the tubular outer wall 34, and the sleeve 300 (e.g., the third portion 314) is secured to the horizontal structural member 18, the tubular outer wall 34 is rigidly coupled to the horizontal structural member 18 such that relative movement of the horizontal structural member 18 and the tubular outer wall 34 is blocked. According to one embodiment, the rigid coupling is designed such that in the event of a catastrophic failure, the intermediate portion 326 of the of the yield plate 320 fails first, allowing relative rotation of the horizontal structural member 18 and the tubular outer wall 34 about the pin 317.

Such rotation may be limited/stopped by abutment of the planar surface 93 of the bracket 80 and the planar surface 313 of the sleeve 300. For example, rotation in one direction (e.g., clockwise as viewed in FIG. 8) may be limited/stopped by abutment of the planar surface 93 and the planar surface 313 of the lower lateral coupler 17 (e.g., the lateral coupler 17 coupled to the second joint member 232), and rotation in another direction (e.g., counterclockwise as viewed in FIG. 8) may be limited/stopped by abutment of the planar surface 93 and the planar surface 313 of the upper lateral coupler 17 (e.g., the lateral coupler 17 coupled to the first joint member 32).

Such an arrangement may potentially limit damage to components of the connector 30 beyond the yield plate 320, such that repair of the connector 30 includes removal and replacement of the failed yield plate 320 with a new yield plate 320. According to one embodiment, this replacement involves the removal of components connected by fasteners and not any components that are welded together. During repair/replacement of the failed yield plate 320 with the new yield plate 320, if portions of the fasteners 94 were unable to be removed, the new yield plate 320 may be fastened by other methods (e.g., welded) to the bracket 80 and/or the sleeve 300.

As shown, the connector 30 may include a first lateral coupler 17 secured to the tubular outer wall 34 of the first joint member 32, and a second lateral coupler 17 secured to the tubular outer wall 234 of the second joint member 232. The second lateral coupler 17 may be identical to the first lateral coupler 17 as described above. As shown, the first lateral coupler 17 and the second lateral coupler 17 may be oriented such that the yield plate 320 and the fasteners 332 of each of the first and second lateral couplers 17 face away from the other of the first and second couplers 17 (i.e., the yield plate 320 and the fasteners 332 are not positioned between the first and second couplers 17). This orientation may result in easier access to the yield plate 320 and the fasteners 94 during installation, assembly, repair, and replacement of the connectors 30.

Figure 10:
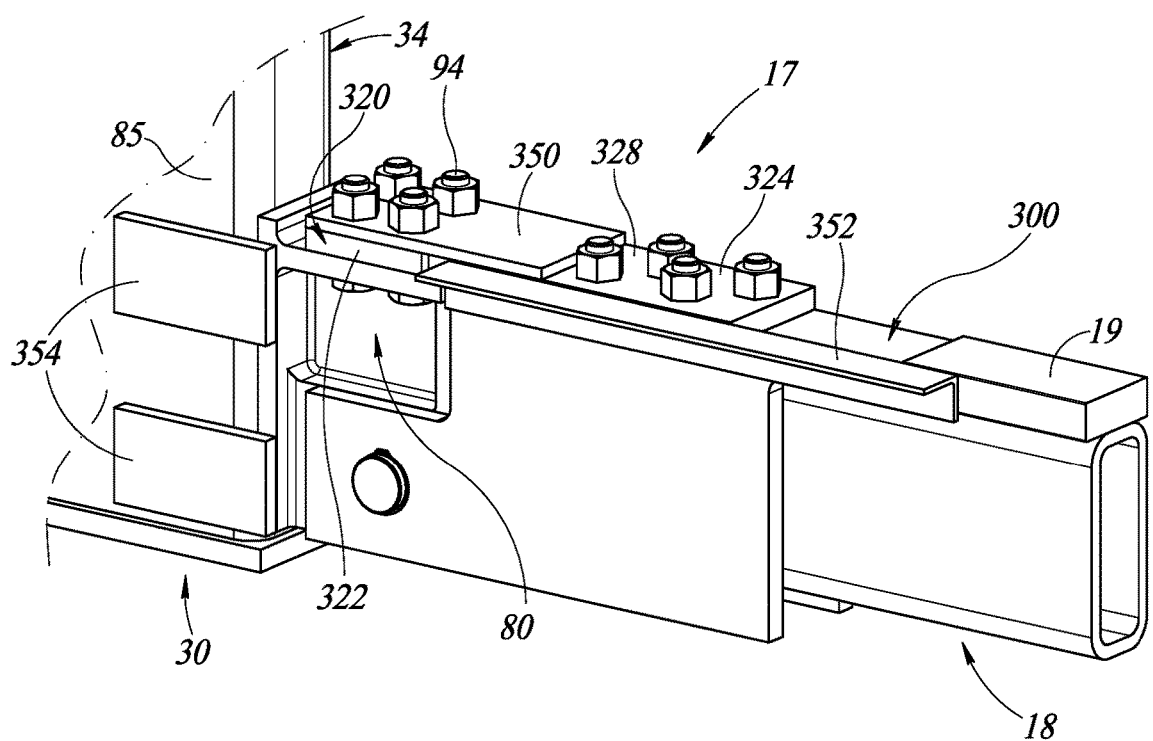
FIG. 10 is an isometric view of a portion of the connector illustrated in FIG. 4 according to one embodiment.
Figure 11:
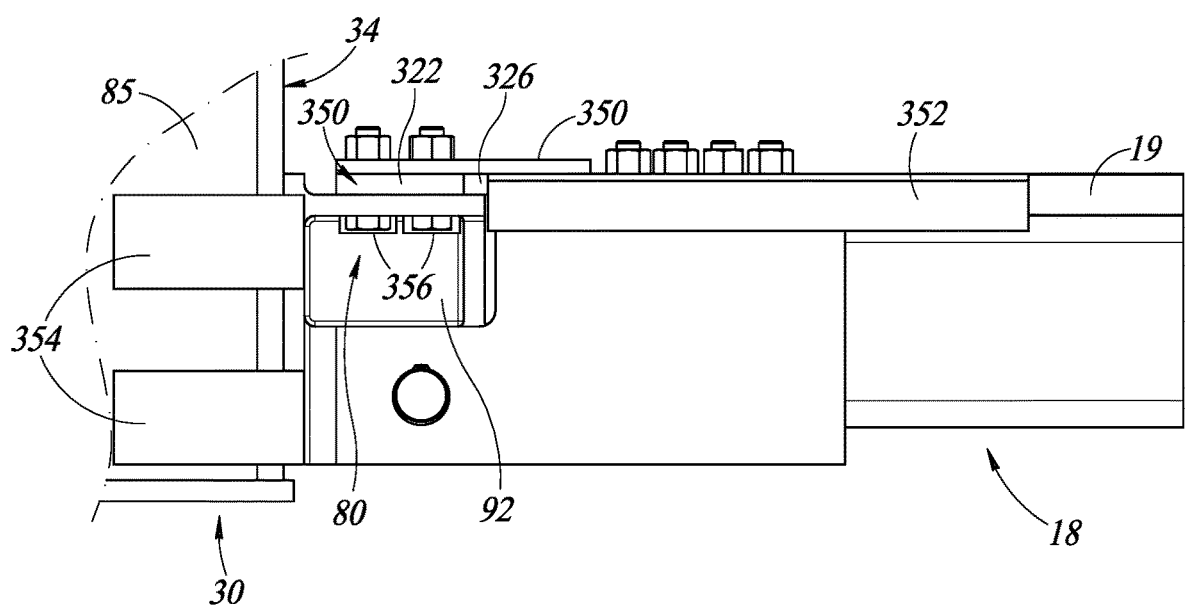
FIG. 11 is a side elevation view of the portion of the connector illustrated in FIG. 10.
Figure 12:
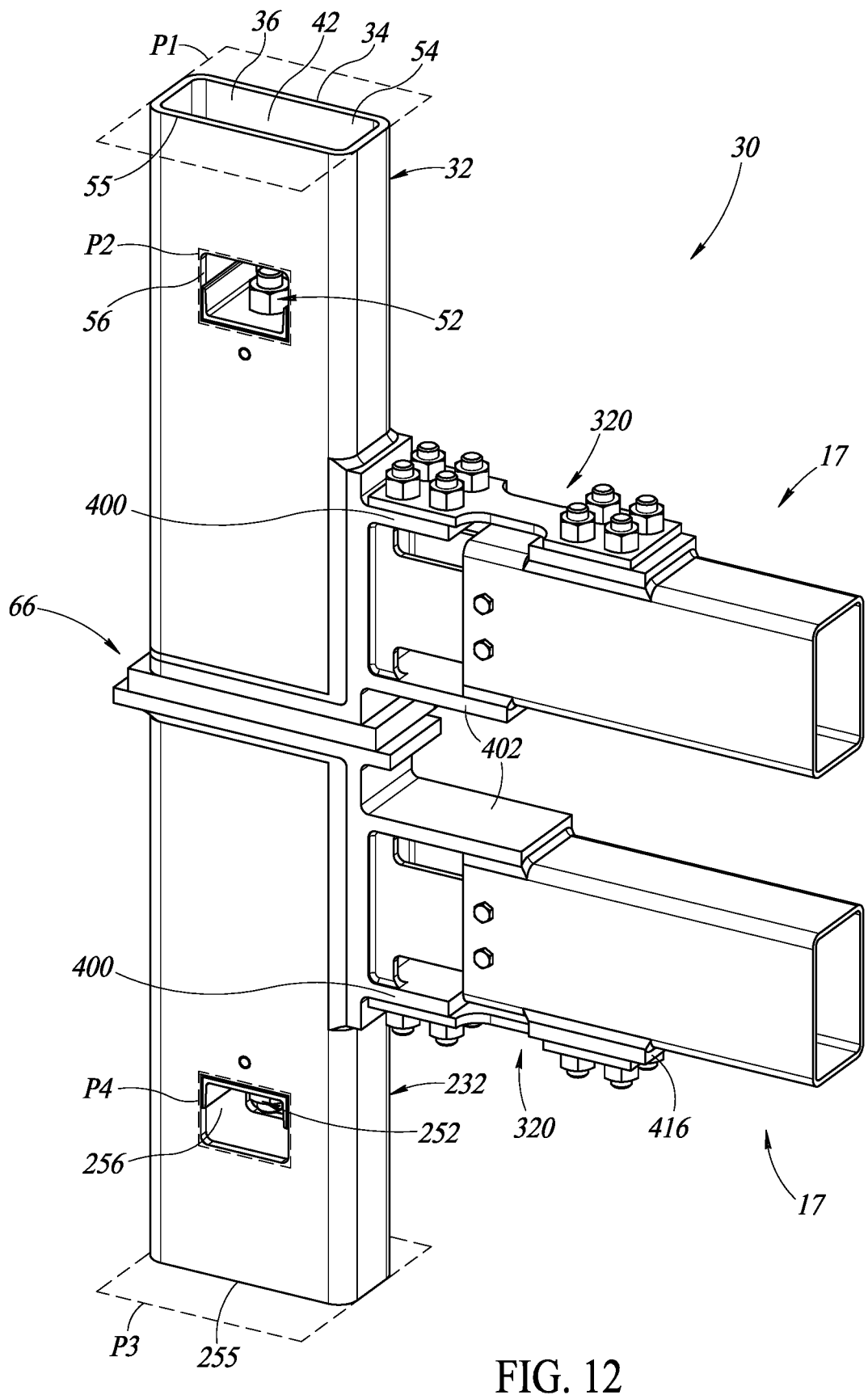
FIG. 12 is an isometric view of a connector, according to one embodiment.
Figure 13:
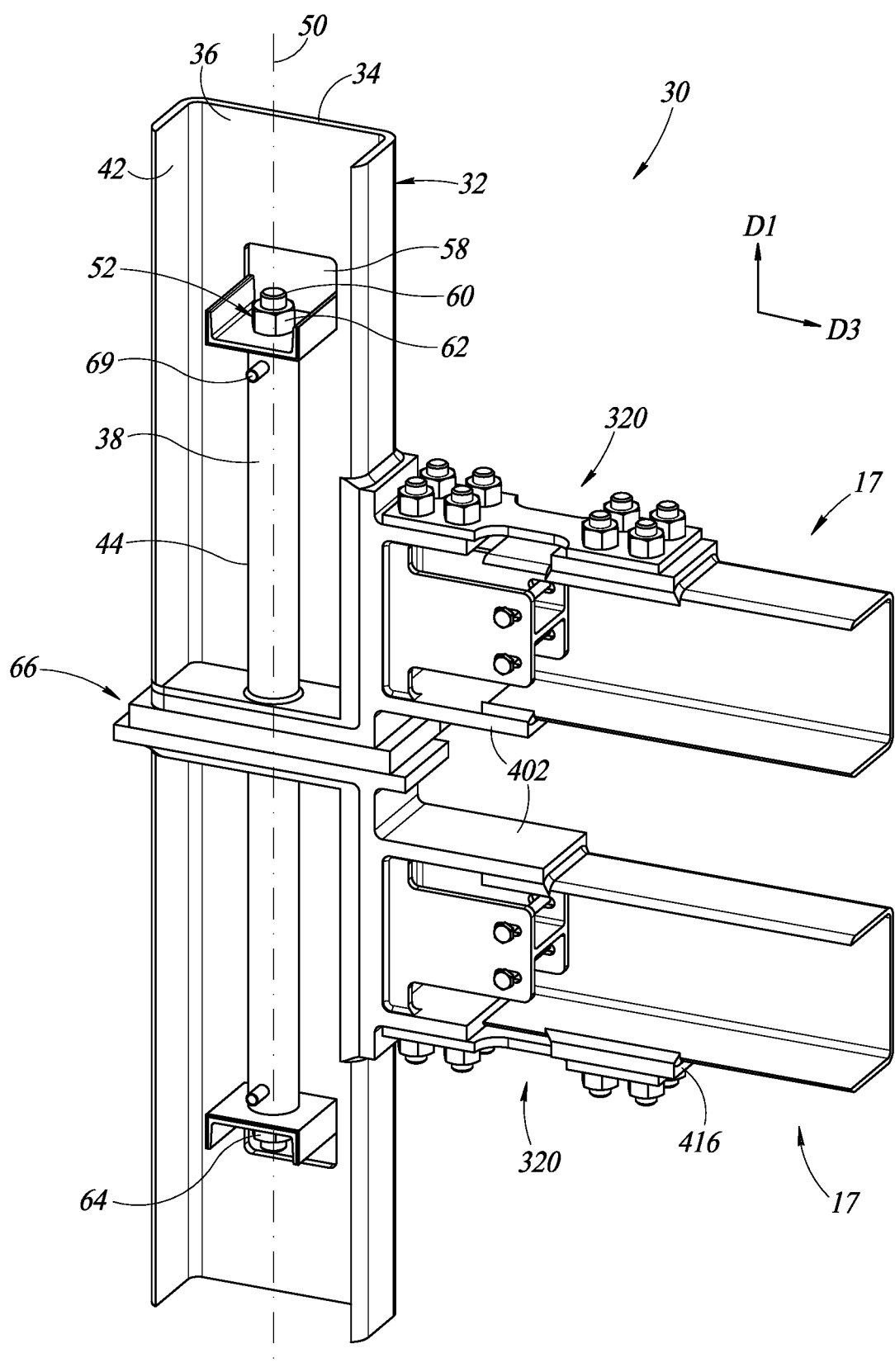
FIG. 13 is an isometric view of the connector illustrated in FIG. 12 with selected exterior surfaces removed to better show the arrangement of internal components within the connector.
Figure 14:
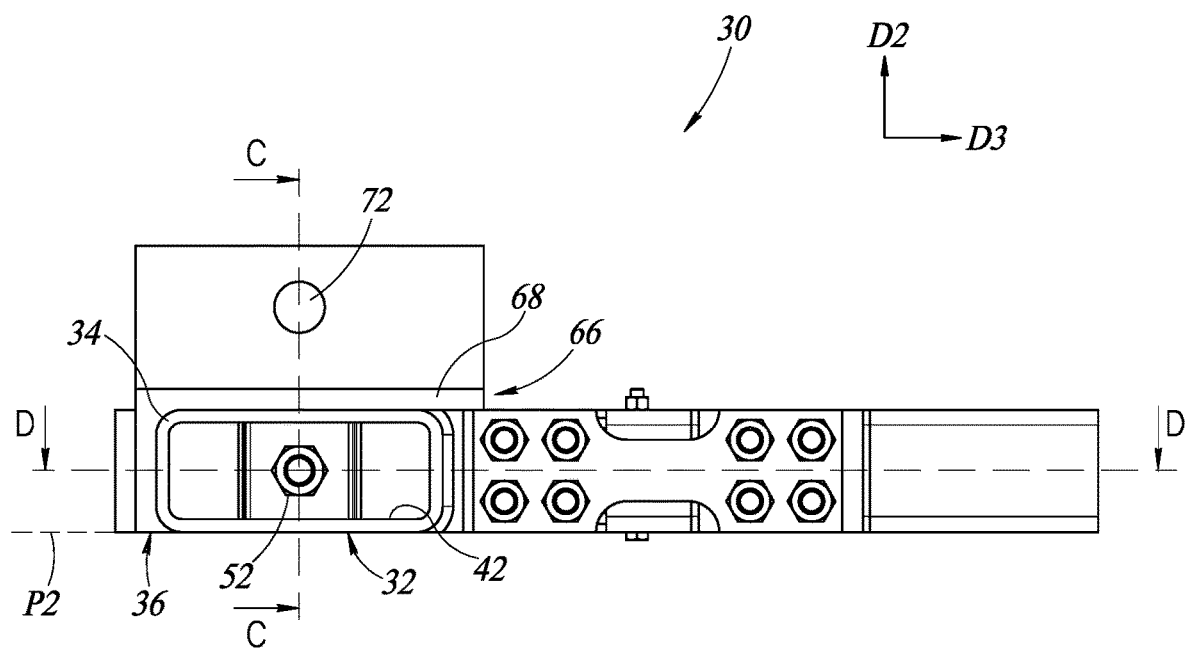
FIG. 14 is a top plan view of the connector illustrated in FIG. 12.
Figure 15:
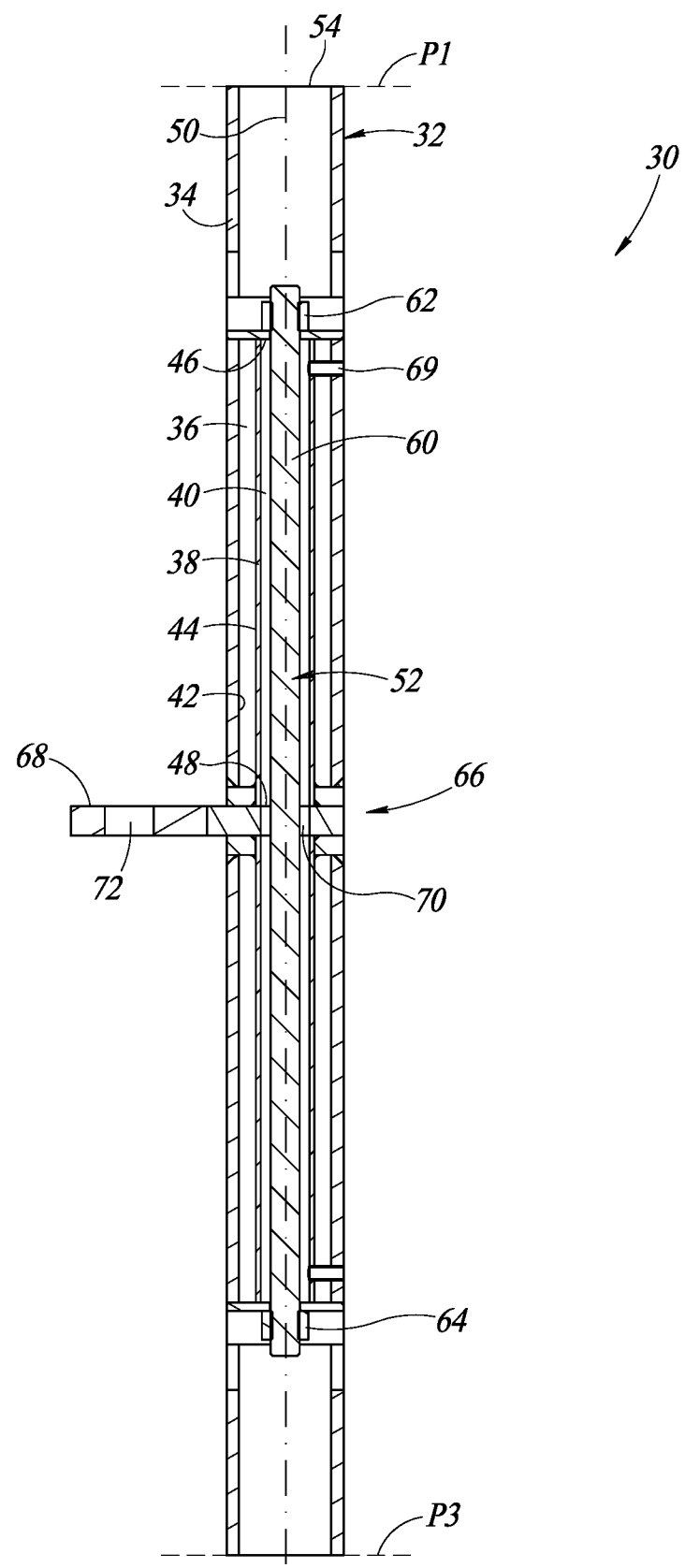
FIG. 15 is a cross-sectional view of the connector illustrated in FIG. 12, along line C-C of FIG. 14.
Figure 16:
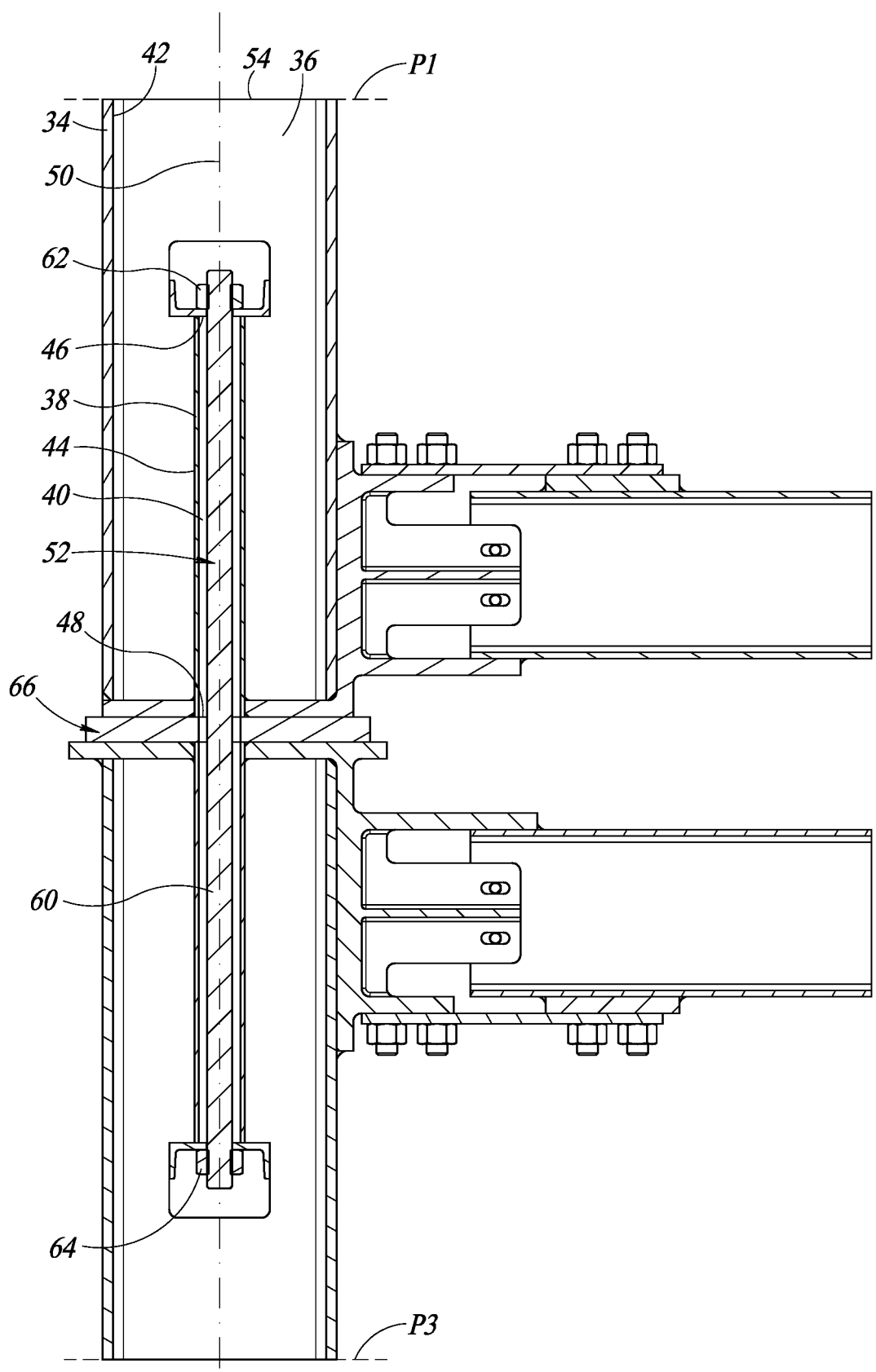
FIG. 16 is a cross-sectional view of the connector illustrated in FIG. 12, along line D-D of FIG. 14.
Figure 17:
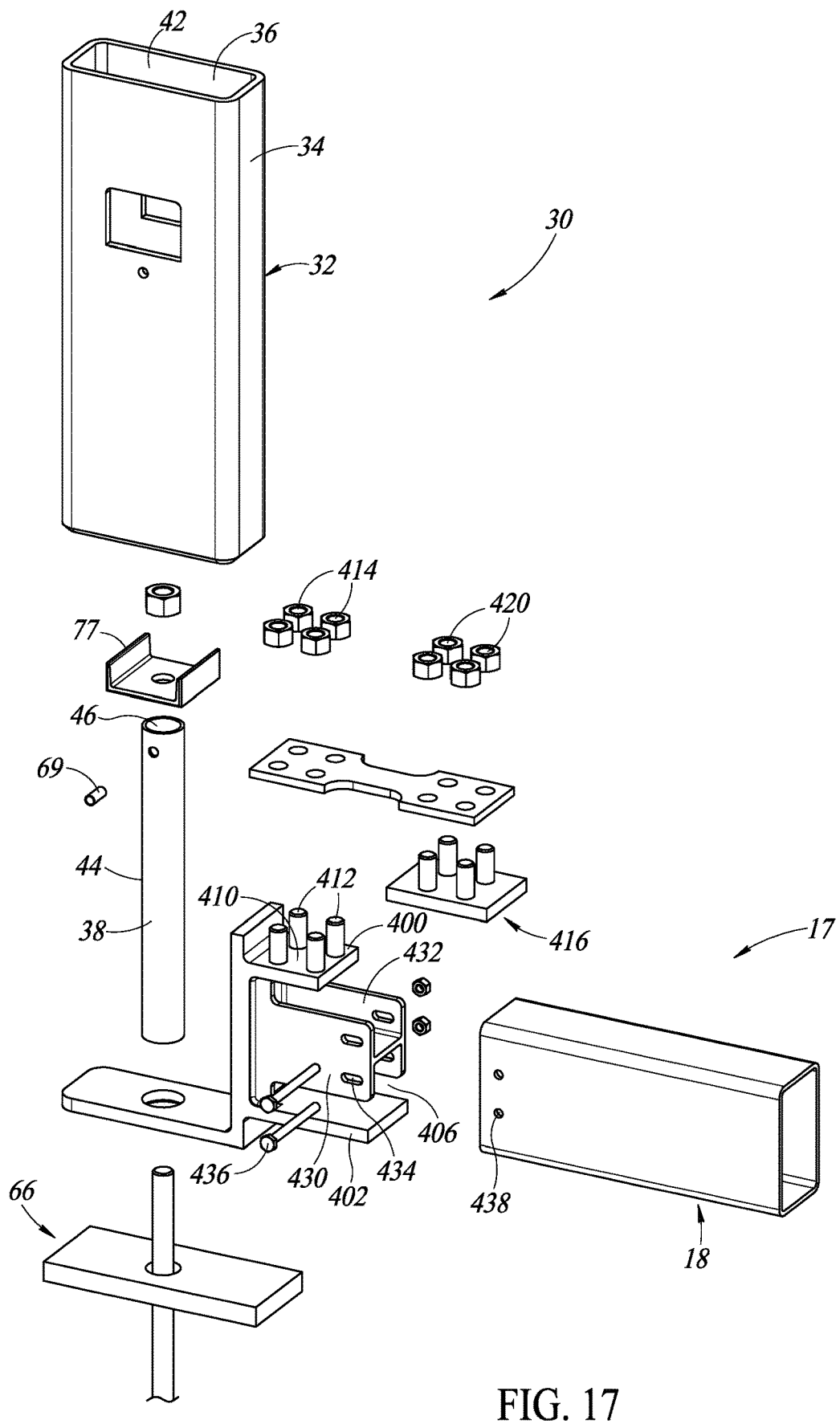
FIG. 17 is an exploded view of a first joint body of the connector illustrated in FIG. 12.

Referring to FIGS. 10 and 11, the lateral coupler 17 may include a restraint plate 350. As shown, the restraint plate 350 may abut a surface (e.g., the planar surface 328, or another planar surface opposite the planar surface 328) of the yield plate 320. According to one embodiment the restraint plate 350 may be secured to the yield plate 320 via fasteners (e.g., the fasteners 94). When the lateral coupler 17 is in the assembled configuration (e.g., with the first terminal end portion 322 captured between the bracket 80 and the restraint plate 350) the intermediate portion 326 may be supported (i.e., braced) in both vertical directions (perpendicular to the planar surface 328) to strengthen the intermediate portion 326 of the yield plate 320 and prevent failure due to vertical forces. As shown the restraint plate 350 may be coupled only to the first terminal end portion 322 and not to the second terminal end portion 324 so as not to strengthen the yield plate 320 in the lateral direction. This enables the yield plate 320 to function as intended and fail predictably (so as to be repaired efficiently) in response to lateral forces.

The lateral coupler 17 may include an angle bracket 352 (e.g., carried by the sleeve 300 so as to provide additional support for components (e.g., floors, ceilings, ducts, etc.) to be attached to the connector 30. As shown, the angle bracket 352 may be positioned with a surface that is flush to a surface of the nailer 19.

According to one embodiment, the bracket 80 may include one or more wings 352 that provide additional surfaces of the bracket 80 for attachment to the outer surface 85 of the tubular outer wall 34. As shown, the wings 352 may be in the form of a plate with a planar surface that may abut and be attached (e.g., welded) to the outer surface 85 of the tubular outer wall 34. The bracket 80 may include paired wings 352 that abut opposite surfaces (e.g., with respect to the second direction D2) of the tubular outer wall 34. As shown, the bracket 80 may include multiple pairs of wings 352 (e.g., a first pair of the wings 352 near a top of the bracket 80 and a second pair of wings 352 near a bottom (opposite the top with respect to the first direction D1) of the bracket 80. Thus, securing the bracket 80 to the tubular outer member 34 may involve multiple surfaces (e.g., up to three surfaces) of the bracket 80 being attached (e.g., welded) to multiple surfaces (e.g., up to three surfaces) of the tubular outer member 34.

The neck 92 may include one or more pass-throughs 356 that provide access to the fasteners 94 on one side of the bracket 80 from the other side of the bracket 80.

Referring to FIGS. 12 to 17, the lateral coupler 17 may include a first flange 400 that extends away from the outer surface 85 of the tubular outer wall 34 in a direction that is perpendicular to the first direction D1, and a second flange 402 that extends away from the outer surface 85 of the tubular outer wall 34 in the same direction as the first flange 400. As shown, the first flange 400 may be spaced from the second flange 402 in the first direction D1. According to one embodiment, the first flange 400 is spaced from the second flange 402 by a distance sufficient to form a gap 406 sized to receive the horizontal structural member 18 (e.g., a hollow structural section beam that is 10"×6"×0.375").

The first flange 400 may include one or more through holes formed in a planar surface 410 of the first flange 400. The first flange 400 may correspond to the first terminal end portion 322 of the yield plate 320. For example, through holes formed by the planar surface 410 may align with the one or more through holes 330 when the yield plate 320 is secured to the first flange 400 (e.g., when the planar surface 328 abuts the planar surface 410). According to one embodiment, the aligned through holes may each receive a fastener (e.g., the fastener 94) that secures the yield plate 320 to the first flange 400. As shown, the first flange 400 may include a plurality of threaded shafts 412 arranged to correspond to the positions of the one or more through holes 330, and the yield plate 320 may be secured to the first flange 400 by threading a nut 414 onto each of the threaded shafts 412.

Similarly, the second terminal end portion 324 may correspond to a plate 416 secured (e.g., welded) to the horizontal structural member 18. According to one embodiment, the plate 416 may include a plurality of threaded shafts 418 (e.g., threaded shafts identical to the plurality of threaded shafts 412) arranged to correspond to the positions of the one or more through holes 336, and the yield plate 320 may be secured to the plate 416 (and thereby secured to the horizontal structural member 18) by threading a nut 420 onto each of the threaded shafts 418.

The lateral coupler 17 may include a third flange 430 that extends away from the outer surface 85 of the tubular outer wall 34 in a direction that is perpendicular to the first direction D1, and a fourth flange 432 that extends away from the outer surface 85 of the tubular outer wall 34 in the same direction as the third flange 430. As shown, the third flange 430 and the fourth flange 432 may be positioned between the first flange 400 and the second flange 402 with respect to the first direction D1. The third flange 430 and the fourth flange 432 may include elongated slots 434 that are aligned so as to receive a fastener 436 therethrough. The third flange 430 and the fourth flange 432 may abut the horizontal structural member 18 (e.g., opposed internal surfaces of the horizontal structural member 18) such that the slots 434 are aligned with through holes 438 of the horizontal structural member 18.

When the yield plate 320 is secured to both the first flange 400 and the horizontal structural member 18 (e.g., via the plate 416), and respective ones of the fastener 436 are inserted through aligned pairs of the elongated slot 434 and the through holes 438 the tubular outer wall 34 is rigidly coupled to the horizontal structural member 18 such that relative movement of the horizontal structural member 18 and the tubular outer wall 34 is blocked. According to one embodiment, the rigid coupling is designed such that in the event of a catastrophic failure, the intermediate portion 326 of the of the yield plate 320 fails first, allowing relative movement of the horizontal structural member 18 and the tubular outer wall 34 via the one or more fasteners 436 in the elongated slots 434. Such an arrangement may potentially limit damage to components of the connector 30 beyond the yield plate 320, such that repair of the connector 30 includes removal and replacement of the failed yield plate 320 with a new yield plate 320. According to one embodiment, this replacement involves the removal of components connected by fasteners and not any components that are welded together.

As shown, the connector 30 may include a first lateral coupler 17 secured to the tubular outer wall 34 of the first joint member 32, and a second lateral coupler 17 secured to the tubular outer wall 234 of the second joint member 232. The second lateral coupler 17 may be identical to the first lateral coupler 17 as described above. As shown, the first lateral coupler 17 and the second lateral coupler 17 may be oriented such that the yield plate 320 and the fasteners 332 of each of the first and second couplers 17 face away from the other of the first and second couplers 17 (i.e., the yield plate 320 and the fasteners 412, 414, 420 are not positioned between the first and second couplers 17). This orientation may result in easier access to the yield plate 320 and the fasteners 332 during installation, assembly, repair, and replacement of the connectors 30.

Referring to FIGS. 2 to 17, the vertical structural member 16 may form the tubular outer wall 34. Thus, the vertical structural member 16 may have multiple lateral couplers 17 secured to the tubular outer wall (e.g., one at each of the top and bottom ends of the vertical structural member 16. According to one embodiment, the vertical structural member 16 may be secured (e.g., welded) to the connector 30 (e.g., the tubular outer wall 34). The connector 30 may secure a vertical structural member 16 to a horizontal structural member 18 with only the first joint member 32, such that the connector 30 is devoid of the second joint member 232 (e.g., when the connector 30 is positioned at the bottom of the modular structure 10).

According to one embodiment, a method of securing a plurality of structural section members (e.g., one or more of the horizontal structural member 18 to one or more of the vertical structural member 16) includes securing a first vertical structural member 16 (e.g., a hollow structural section column) to the tubular outer wall 34 of the first joint member 32. The method may further include securing a second vertical structural member 16 (e.g., a hollow structural section column) to the tubular outer wall 234 of the second joint member 232. The method may further include positioning a first portion of the 52 fastener within the inner cavity 40 of the first joint member 32 and positioning a second portion of the fastener 52 within the inner cavity 240 of the second joint member 232 such that the fastener simultaneously extends through: the first opening 46, the second opening 248, the first opening 246, and the second opening 248.

The method may further include accessing the fastener 52 through the second opening 56 formed by the tubular outer wall 34 of the first joint member 32, and while accessing the fastener 52 through the second opening 56, actuating the fastener 52 thereby applying compression to both the first joint member 32 and the second joint member 232. According to one embodiment, actuating the fastener may include rotating the internally threaded nut 62 relative to the externally threaded rod 60 about the axis 50, thereby translating the internally threaded nut 62 relative to the externally threaded rod 60 via engagement of corresponding threads.

The method may further include accessing the fastener 52 through the 256 opening formed by the tubular outer wall 234 of the second joint member 232, and accessing the fastener 52 through the second opening 256. According to one embodiment, actuating the fastener 52 includes rotating at least one of the first internally threaded nut 62 and the second internally threaded nut 64 of the fastener 52 relative to the externally threaded rod 60 about the axis 50, thereby translating the at least one of the first internally threaded nut 62 and the second internally threaded nut 64 relative to the externally threaded rod 60 via engagement of corresponding threads.

The method may further include filling at least a portion of the inner cavity 40 of the first joint member 32 between the first portion of the fastener 52 and the tubular inner wall 38 of the first joint member 32 with a material (e.g., gravel). The method may further include filling at least a portion of the inner cavity 240 of the second joint member 232 between the second portion of the fastener 52 and the tubular inner wall 238 of the second joint member with the material.

The method may include filling at least a portion of the inner cavity 40 of the first joint member 32 with the material by inserting the material through a pipe 69 that extends from the tubular outer wall 34 of the first joint member 32 to the tubular inner wall 38 of the first joint member 32 thereby forming a path from an exterior of the first joint member 32 to the inner cavity 40 of the first joint member 32. According to one embodiment, the pipe 69 may be attached to the tubular inner wall 38 at a location between the first opening 46 and the second opening 48.

Referring to FIGS. 2 to 12, a method of securing a plurality of structural members may include securing the bracket 80 to the tubular outer wall 34 (e.g., of the vertical structural support 16) such that one of the first bracket through holes 84 extends through the first portion 82 of the bracket 80 along an axis that is parallel to the first direction D1, and such that the second bracket through hole 88 extends through the second portion 86 of the bracket 80 along an axis that is parallel to a direction perpendicular to the first direction. The method may further include securing the sleeve 300 to the bracket 80 such that one of the first sleeve through holes 304 extends through the first portion 302 of the sleeve 300 along an axis that is parallel to the first direction D1 by aligning the second sleeve through hole 308 with the second bracket through hole 88 and inserting the pin 317 through the aligned second sleeve through hole 308 and the second bracket through hole 88.

The method may further include securing the yield plate 320 to the bracket 80 such that one of the first plate through holes 330 extends through the first terminal end portion 322 of the yield plate 320 along an axis that is parallel to the first direction D1 by aligning the first plate through hole 330 with the first bracket through hole 84 and inserting the fastener 94 through the aligned first plate through hole 330 and the first bracket through hole 84. The method may include securing the yield plate 320 to the sleeve 300 such that one of the second plate through holes 336 extends through the second terminal end portion 324 of the yield plate 320 along an axis that is parallel to the first direction D1 by aligning the second plate through hole 336 with the first sleeve through hole 304 and inserting the fastener 94 through the aligned second plate through hole 336 and the first sleeve through hole 304. The method may include securing (e.g., welding) a first hollow structural section beam to the third portion 314 of the sleeve 300.

Figure 20:
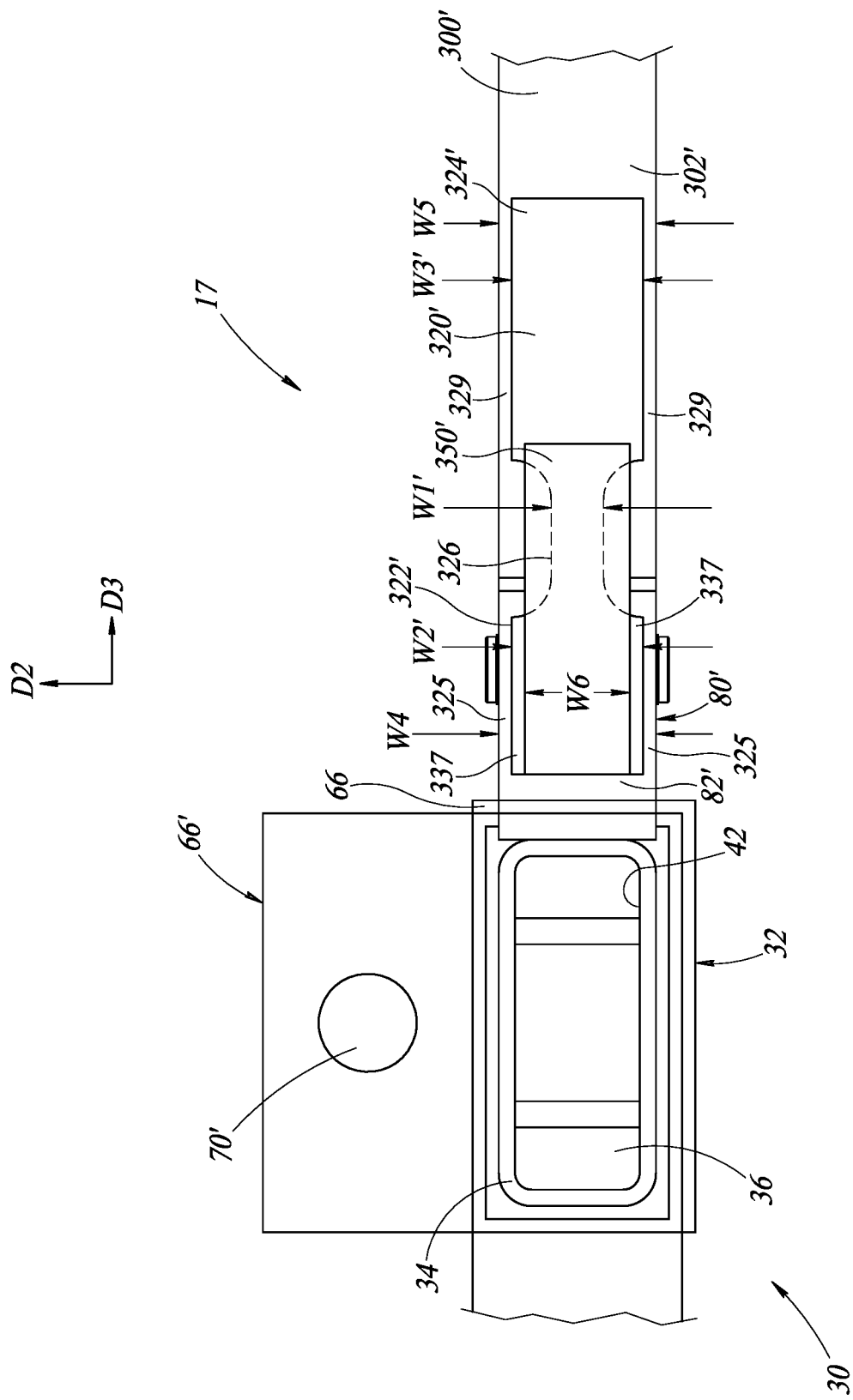
FIG. 20 is a top plan view of the connector illustrated in FIG. 18.

Referring to FIGS. 18 to 20, the lateral coupler 17 may be devoid of any fasteners. According to one embodiment, the lateral coupler 17 may include a yield plate 320'. The yield plate 320' may be the same as the yield plate 320 as described above, except for differences described below. The yield plate 320' may have a dog-bone shape (e.g., two wider ends and a thinner, intermediate, portion between the two ends). The yield plate 320' may have a first terminal end portion 322', a second terminal end portion 324', and an intermediate portion 326' between the first terminal end portion 322' and the second terminal end portion 324'.

The intermediate portion 326' may have a width W1' measured similar to the width W1 of the yield plate 320 (e.g., along the second direction D2, or perpendicular to a radial ray extending from the axis 50 when the lateral coupler 17 is secured relative to the tubular outer wall 34). The first terminal end portion 322' may have a width W2' measured in the same direction as the width W1' of the intermediate portion 326', and the second terminal end portion 324' may have a width W3' measured in the same direction as the width W1' of the intermediate portion 326'. According to one embodiment, the width W1' is less than the width W2', and the width W1' is also less than the width W3'. For example the width W1' may be half of the width W2'. According to one embodiment, the width W1' and the width W3' may be equal.

The first terminal end portion 322' may have a surface that corresponds to the first portion 82' of the bracket 80'. For example, the first terminal end portion 322' and the bracket 80' may include planar surfaces that abut when the yield plate 320' is secured to the bracket 80'. As shown, the first portion 82' of the bracket 80' may include a width W4, measured in the same direction as the width W2'. As shown, the width W4 may be greater than the width W2' such that when the yield plate 320' is placed in contact with the bracket 80' a ledge 325 is formed.

The ledge 325 may provide a convenient location for a weld 327 that secures the yield plate 320' to the bracket 80'. Thus, the first terminal end portion 322' may be devoid of any through holes (e.g., through holes that receive fasteners that secure the yield plate 320' to the bracket 80'). According to one embodiment, the width W2' may be 5 inches, the width W4 may be 6 inches, and the yield plate 320' may be placed such that the ledge 325 on either side of the yield plate 320' is equal (e.g., about 0.5 inches).

The second terminal end portion 324' may have a surface that corresponds to the first portion 302' of the sleeve 300'. For example, the second terminal end portion 324' and the sleeve 300' may include planar surfaces that abut when the yield plate 320' is secured to the sleeve 300'. As shown, the first portion 302' of the sleeve 300' may include a width W5, measured in the same direction as the width W3'. As shown, the width W5 may be greater than the width W3' such that when the yield plate 320' is placed in contact with the sleeve 300' a ledge 329 is formed. The ledge 329 may provide a convenient location for a weld 331 that secures the yield plate 320' to the sleeve 300'.

According to one embodiment, the width W3' may be 5 inches, the width W5 may be 6 inches, and the yield plate 320' may be placed such that the ledge 329 on either side of the yield plate 320' is equal (e.g., about 0.5 inches). The yield plate 320' may further be secured to the sleeve 300' by a weld 333 at an interface of the first portion 302' of the sleeve 300' and a front face 335 of the yield plate 320'. Thus, the second terminal end portion 324' may be devoid of any through holes (e.g., through holes that receive fasteners that secure the yield plate 320' to the sleeve 300').

According to one embodiment, the lateral coupler 17 may include a restraint plate 350'. The restraint plate 350' may be the same as the restraint plate 350 as described above, except for differences described below. As shown, the restraint plate 350' may be devoid of any through holes (e.g., through holes that receive fasteners that secure the restraint plate 350' to the yield plate 320').

The restraint plate 350' may have a surface that corresponds to the first terminal end portion 322' of the yield plate 320'. For example, the first terminal end portion 322' and the restraint plate 350' may include planar surfaces that abut when the yield plate 320' is secured to the restraint plate 350'. As shown, the restraint plate 350' may include a width W6, measured in the same direction as the width W2'. As shown, the width W6 may be less than the width W2' such that when the restraint plate 350' is placed in contact with the yield plate 320' a ledge 337 is formed.

The ledge 337 may provide a convenient location for a weld 339 that secures the restraint plate 350' to the yield plate 320'. According to one embodiment, the width W2' may be 5 inches, the width W6 may be 4 inches, and the yield plate 320' may be placed such that the ledge 337 on either side of the restraint plate 350' is equal (e.g., about 0.5 inches).

According to one embodiment the restraint plate 350' may be secured to the yield plate 320' in an assembled configuration in which the intermediate portion 326' may be supported (i.e., braced) in both vectors of the vertical direction to strengthen the intermediate portion 326' of the yield plate 320' and prevent failure due to vertical forces. As shown the restraint plate 350' may be coupled only to the first terminal end portion 322' and not to the second terminal end portion 324' so as not to strengthen the yield plate 320' in the lateral direction. This enables the yield plate 320' to function as intended and fail predictably (so as to be repaired efficiently) in response to lateral forces.

According to one embodiment, the bracket 80' may include at least one of the wings 352 that provide additional surfaces of the bracket 80' for attachment to the outer surface 85 of the tubular outer wall 34. The wing 352 may be positioned opposite the yield plate 320' with respect to the vertical direction. As shown, the wing 352 may extend from (or proximate) the bottom of the bracket 80' when the yield plate 320' is secured to the top (or proximate) the top of the bracket 80'.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

Many of the methods described herein can be performed with variations. For example, many of the methods may include additional acts, omit some acts, and/or perform acts in a different order than as illustrated or described.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. Provisional Application No. 62/929,698, filed Nov. 1, 2019 and PCT Application No. PCT/US2019/030465, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A connector comprising:
a joint member including a tubular outer wall;
a bracket secured to the tubular outer wall, the bracket including a first bracket through hole that extends along a first axis, the bracket further including a second bracket through hole that extends along a second axis that is perpendicular to the first axis;
a sleeve having a first sleeve through hole that extends along a third axis, the sleeve further including a second sleeve through hole that extends along a fourth axis that is perpendicular to the third axis;
a pin insertable through both the second bracket through hole and the second sleeve through hole to rotatably couple the bracket and the sleeve; and
a yield plate having a first terminal end portion, a second terminal end portion, and an intermediate portion between the first terminal end portion and the second terminal end portion, the yield plate including a first plate through hole that extends through the first terminal end portion along a fifth axis, and the yield plate further including a second plate through hole that extends through the second terminal end portion along a sixth axis,
wherein a width of the intermediate portion measured perpendicular to the first direction is less than a width of the first terminal end portion and is also less than a width of the second terminal end portion, and
wherein the yield plate is securable to the bracket via insertion of a first fastener through both the first bracket through hole and the first plate through hole, and the yield plate is securable to the sleeve via insertion of a second fastener through both the first sleeve through hole and the second plate through hole.

2. The connector of claim 1, wherein the first axis, the third axis, the fifth axis and the sixth axis are all parallel when the yield plate is secured to both the bracket and the sleeve.

3. The connector of claim 1, wherein the bracket includes a first planar surface that forms the first bracket through hole, the bracket includes a second planar surface, the sleeve includes a first planar surface that forms the first sleeve through hole, and the sleeve includes a second planar surface that faces the second planar surface of the bracket when the yield plate is secured to both the bracket and the sleeve.

4. The connector of claim 3 wherein the second planar surface of the bracket is perpendicular to the first planar surface of the bracket, and the second planar surface of the sleeve is perpendicular to the first planar surface of the sleeve.

5. The connector of claim 3 wherein the second planar surface of the bracket is parallel to the second planar surface of the sleeve when the yield plate is secured to both the bracket and the sleeve.

6. The connector of claim 5 wherein the second planar surface of the bracket is separated from the second planar surface of the sleeve by a gap when the yield plate is secured to both the bracket and the sleeve, and the gap is sized to allow rotational movement of the sleeve relative to the bracket in a direction of rotation until abutment of the second planar surface of the bracket with the second planar surface of the sleeve blocks further relative rotation in the direction of rotation.

7. The connector of claim 1, further comprising a restraining plate securable to the yield plate via insertion of the first fastener through a through hole of the restraining plate, such that a first surface of the intermediate portion of the yield plate abuts the bracket and a second surface of the intermediate portion of the yield plate abuts the restraining plate.

8. A connector comprising:
a first joint member including a first tubular outer wall and a first outer cavity, the first outer cavity at least partially enclosed within the first tubular outer wall, the first joint member further including a first tubular inner wall and a first inner cavity, the first inner wall positioned within the first outer cavity, and the first inner cavity at least partially enclosed within the first tubular inner wall such that at least a portion of a first inner surface of the first tubular outer wall faces at least a portion of a first outer surface of the first tubular inner wall, wherein the first tubular inner wall forms a first opening and a second opening of the first inner cavity, the first opening spaced from the second opening along an axis that extends in a first direction;
a second joint member including a second tubular outer wall and a second outer cavity, the second outer cavity at least partially enclosed within the second tubular outer wall, the second joint member further including a second tubular inner wall and a second inner cavity, the second tubular inner wall positioned within the second outer cavity, and the second inner cavity at least partially enclosed within the second tubular inner wall such that at least a portion of a second inner surface of the second tubular outer wall faces at least a portion of a second outer surface of the second tubular inner wall, wherein the second tubular inner wall forms a first opening and a second opening of the second inner cavity, the first opening spaced from the second opening along the axis; and a fastener that extends through the first opening of the first inner cavity, the second opening of the first inner cavity, the first opening of the second inner cavity, and the second opening of the second inner cavity to position the first joint member relative to the second joint member.

9. The connector of claim 8 wherein the first tubular outer wall forms a first opening of the first outer cavity, and the first opening of the first outer cavity is formed within a first plane that is normal to the axis, the first tubular outer wall forms a second opening of the first outer cavity, and the second opening of the first outer cavity is formed within a second plane that is perpendicular to the first plane.

10. The connector of claim 9 wherein the second tubular outer wall forms a first opening of the second outer cavity, and the first opening of the second outer cavity is formed within a third plane that is parallel to the first plane, the second tubular outer wall forms a second opening of the second outer cavity, and the second opening of the second outer cavity is formed within the second plane.

11. The connector of claim 10 wherein the fastener includes at least one actuator that is rotatable about the axis to apply compression to the first joint body and the second joint body, the fastener includes an externally threaded rod, the at least one actuator includes a first internally threaded nut, the first internally threaded nut is threaded onto the externally threaded rod and positioned at a location spaced radially inward from the second opening of the first outer cavity with respect to the axis, the at least one actuator includes a second internally threaded nut, and the second internally threaded nut threaded onto the externally threaded rod and positioned at a location spaced radially inward from the second opening of the second outer cavity with respect to the axis.

12. The connector of claim 8 wherein a cross-sectional area of the first inner cavity is greater than a cross-sectional area of the fastener, the first tubular inner wall forms a third opening of the first inner cavity, the third opening is positioned between the first opening of the first inner cavity and the second opening of the first inner cavity with respect to the first direction, and the third opening extends through the first tubular inner wall in a direction perpendicular to the first direction.

13. The connector of claim 8, further comprising:
a third joint member positioned between the first joint member and the second joint member with respect to the first direction, the third joint member including a first through hole sized to receive the fastener,
wherein the third joint member is a plate with opposed planar surfaces, and the first through hole extends through both of the opposed planar surfaces.

14. The connector of claim 8, further comprising:
a bracket that extends away from the tubular outer wall in a direction that is perpendicular to the first direction, the bracket including a first bracket through hole that extends along an axis that is parallel to the first direction, the bracket further including a second bracket through hole that extends along an axis that is perpendicular to the first direction and the axis of the first bracket through hole.

15. The connector of claim 14, further comprising:
a sleeve having a first sleeve through hole that extends along an axis that is parallel to the first direction, the sleeve further including a second sleeve through hole that extends along an axis that is perpendicular to the first direction and the axis of the first sleeve through hole,
wherein the bracket is securable to the sleeve via insertion of a pin through the second bracket through hole and the second sleeve through hole.

16. The connector of claim 15, further comprising:
a yield plate having a first terminal end portion, a second terminal end portion, and an intermediate portion between the first terminal end portion and the second terminal end portion, the yield plate including a first plate through hole that extends through the first terminal end portion along an axis that is parallel to the first direction, and the yield plate further including a second plate through hole that extends through the second terminal end portion along an axes that is parallel to the first direction,
wherein a width of the intermediate portion measured perpendicular to the first direction is less than a width of the first terminal end portion and is also less than a width of the second terminal end portion, and
wherein the yield plate is securable to the bracket via insertion of a first fastener through the first bracket through hole and the first plate through hole, and the yield plate is securable to the sleeve via insertion of a second fastener through the first sleeve through hole and the second plate through hole.

17. A connector comprising:
a joint member including a tubular outer wall and an outer cavity, the outer cavity at least partially enclosed within the outer wall, the joint member further including a tubular inner wall and an inner cavity, the tubular inner wall positioned within the outer cavity, and the inner cavity at least partially enclosed within the tubular inner wall such that at least a portion of an inner surface of the tubular outer wall faces at least a portion of an outer surface of the tubular inner wall,
wherein the tubular inner wall forms a first opening and a second opening of the inner cavity, and the first opening is spaced from the second opening along an axis,
wherein the tubular outer wall forms a first opening and a second opening of the outer cavity, the first opening of the outer cavity is formed within a first plane that is normal to the axis, and the second opening of the outer cavity is formed within a second plane that is perpendicular to the first plane.

18. The connector of claim 17 wherein at least a portion of the second opening of the outer cavity is positioned closer to the first opening of the outer cavity, as measured along a direction parallel to the axis, than the first opening of the inner cavity is from the first opening of the outer cavity as measured along the direction parallel to the axis.

19. The connector of claim 18 wherein a cross-sectional area of the second opening of the outer cavity measured within the second plane is greater than a cross-sectional area of the first opening of the inner cavity measured within a plane normal to the axis.

20. The connector of claim 18 wherein the inner wall forms a third opening of the inner cavity, the third opening positioned between the first opening of the inner cavity and the second opening of the inner cavity with respect to the direction parallel to the axis.

21. The connector of claim 17, further comprising:
a bracket that extends away from the tubular outer wall in a direction that is perpendicular to the first direction, the bracket including a first bracket through hole that extends along an axis that is parallel to the first direction, the bracket further including a second bracket through hole that extends along an axis that is perpendicular to the first direction and the axis of the first bracket through hole;
a sleeve having a first sleeve through hole that extends along an axis that is parallel to the first direction, the sleeve further including a second sleeve through hole that extends along an axis that is perpendicular to the first direction and the axis of the first sleeve through hole; and
a yield plate having a first terminal end portion, a second terminal end portion, and an intermediate portion between the first terminal end portion and the second terminal end portion, the yield plate including a first plate through hole that extends through the first terminal end portion along an axis that is parallel to the first direction, and the yield plate further including a second plate through hole that extends through the second terminal end portion along an axes that is parallel to the first direction,
wherein the bracket is securable to the sleeve via insertion of a pin through the second bracket through hole and the second sleeve through hole, a width of the intermediate portion measured perpendicular to the first direction is less than a width of the first terminal end portion and is also less than a width of the second terminal end portion, the yield plate is securable to the bracket via insertion of a first fastener through the first bracket through hole and the first plate through hole, and the yield plate is securable to the sleeve via insertion of a second fastener through the first sleeve through hole and the second plate through hole.

22. A connector comprising:
a joint member including a tubular outer wall;
a bracket secured to the tubular outer wall, the bracket including a first bracket through hole that extends along a first axis, the bracket further including a second bracket through hole that extends along a second axis that is perpendicular to the first axis;
a sleeve having a first sleeve through hole that extends along a third axis, the sleeve further including a second sleeve through hole that extends along a fourth axis that is perpendicular to the third axis;
a pin insertable through both the second bracket through hole and the second sleeve through hole to rotatably couple the bracket and the sleeve; and
a yield plate having a first terminal end portion, a second terminal end portion, and an intermediate portion between the first terminal end portion and the second terminal end portion,
wherein a width of the intermediate portion measured perpendicular to the first direction is less than a width of the first terminal end portion and is also less than a width of the second terminal end portion,
wherein the first terminal end portion is securable to the bracket and the second terminal end portion is securable to the sleeve such that the intermediate portion spans a gap between the bracket and the sleeve, and
wherein the bracket includes a first planar surface that abuts the first terminal end portion when the bracket is secured to the yield plate, and the first planar surface includes a width that is greater than the width of the first terminal end portion, the first terminal end portion abuts the first planar surface of the bracket to form a ledge, and a weld formed along the ledge secures the bracket to the yield plate.

23. The connector of claim 22 wherein the sleeve includes a second planar surface that abuts the second terminal end portion when the sleeve is secured to the yield plate, and the second planar surface includes a width that is greater than the width of the second terminal end portion, wherein the second terminal end portion abuts the second planar surface of the sleeve to form a second ledge, and a second weld formed along the second ledge secures the sleeve to the yield plate.

24. The connector of claim 23, further comprising:
a restraining plate securable to the first terminal end portion of the yield plate such that the first terminal end portion is captured between the bracket and the restraining plate,
wherein the restraining plate includes a width that is less than the width of the first terminal end portion, the restraining plate abuts the first terminal end portion to form a third ledge, and a third weld formed along the third ledge secures the restraining plate to the yield plate.

* * * * *